United States Patent
Zeng et al.

(10) Patent No.: US 10,479,004 B2
(45) Date of Patent: Nov. 19, 2019

(54) MATERIAL SYSTEMS AND METHODS OF MANUFACTURE FOR AUXETIC FOAMS

(71) Applicant: The Florida State University Research Foundation, Inc., Tallahassee, FL (US)

(72) Inventors: Changchun Zeng, Tallahassee, FL (US); Yan Li, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 294 days.

(21) Appl. No.: 15/410,873

(22) Filed: Jan. 20, 2017

(65) Prior Publication Data

US 2017/0129146 A1    May 11, 2017

Related U.S. Application Data

(63) Continuation of application No. PCT/US2015/041713, filed on Jul. 23, 2015.
(Continued)

(51) Int. Cl.
*B29C 44/34* (2006.01)
*C08J 9/00* (2006.01)
(Continued)

(52) U.S. Cl.
CPC .......... *B29C 44/357* (2013.01); *C08J 9/0061* (2013.01); *B29K 2075/00* (2013.01);
(Continued)

(58) Field of Classification Search
None
See application file for complete search history.

(56) References Cited

U.S. PATENT DOCUMENTS 4,668,557 A * 5/1987 Lakes ................... B29C 44/357
                                                     264/321
5,834,527 A   11/1998 Sulzbach
(Continued)

FOREIGN PATENT DOCUMENTS

WO    WO995530 A1    5/1999

OTHER PUBLICATIONS

Lakes, R., Foam Structures with a Negative Poisson's Ratio. Science, New Series, vol. 235, No. 4792 (Feb. 27, 2987), pp. 1038-1040.
(Continued)

*Primary Examiner* — Jeffrey M Wollschlager
*Assistant Examiner* — Armand Melendez
(74) *Attorney, Agent, or Firm* — Meunier Carlin & Curfman LLC

(57) ABSTRACT

A novel material for producing auxetic foams is disclosed. The material comprises a multiphase, multicomponent polymer foam with a filler polymer having a carefully selected glass transition temperature. Novel methods for producing auxetic foams from the material are also disclosed that consistently, reliably and quickly produce auxetic polyurethane foam at about room temperature (25° C.). This technology overcomes challenging issues in the large-scale production of auxetic PU foams, such as unfavorable heat-transmission problem and harmful organic solvents.

17 Claims, 31 Drawing Sheets

Related U.S. Application Data

(60) Provisional application No. 62/029,225, filed on Jul. 25, 2014.

(51) Int. Cl.
  *B29K 75/00* (2006.01)
  *B29K 105/04* (2006.01)
  *B29K 105/16* (2006.01)
  *B29K 425/00* (2006.01)

(52) U.S. Cl.
  CPC .... *B29K 2105/045* (2013.01); *B29K 2105/16* (2013.01); *B29K 2425/08* (2013.01); *C08J 2375/04* (2013.01); *C08J 2425/12* (2013.01)

(56) References Cited

U.S. PATENT DOCUMENTS

| | | | |
|---|---|---|---|
| 7,060,736 B2 | 6/2006 | Reimers et al. | |
| 8,313,682 B2 | 11/2012 | Bianchi et al. | |
| 2003/0132657 A1* | 7/2003 | DiBattista | B29C 49/20 297/452.11 |
| 2008/0275151 A1* | 11/2008 | Strandburg | A61L 15/24 521/143 |
| 2015/0011666 A1* | 1/2015 | McEvoy | B29C 67/246 521/170 |

OTHER PUBLICATIONS

Evans, K. E. et al., Nature, vol. 353, Sep. 12, 1991, p. 124.
Lakes, R.S., No contractile obligations, 1992. Nature, 358, pp. 713-714.
Alderson, A., A triumph of lateral thought, Chemistry and Industry, May 17, 1999; pp. 384-391.
Bianchi, M. et al., Stiffness and energy dissipation in polyurethane auxetic foams. J. Mater Sci. (2008) 43:5851-5860.
Lira, C. et al., The SILICOMB cellular structure: Mechanical and dielectric properties. Phys. Status Solidi B 246, No. 9, 2055-2062 (2009).
Lira, C. and F. Scarpa, Transverse shear stiffness of thickness gradient honeycombs. Composites Science and Technology 70 (2010) 930-936.
Scarpa, F. and G. Tomlinson, Theoretical Characteristics of the Vibration of Sandwich Plates with In-plane Negative Poisson's Ratio Values. Journal of Sound and Vibration (2000) 230(1), 45-67.
Scarpa, F. et al., Mechanical Performance of Auxetic Polyurethane Foam for Antivibration Glove Applications. Cellular Polymers, vol. 24, No. 5, 2005.
Hassan, M.R. et al., Smart shape memory alloy chiral honeycomb. Materials Science and Engineering A 481-482 (2008) 654-657.
Chan, N. and K.E. Evans, The Mechanical Properties of Conventional and Auxetic Foams. Part I: Compression and Tension. Journal of Cellular Plastics, vol. 35, Mar. 1999, pp. 130-165.
Scarpa, F. et al., Auxetic compliant flexible PU foams: static and dynamic properties. Phys. Stat. Sol. (b) 242, No. 3, 681-694 (2005).
Alderson, K. et al., Manufacture and characterisation of thin flat and curved auxetic foam sheets. Phys. Status Solidi B 249, No. 7, 1315-1321 (2012).
Kaushiva, Bryan D., et al., Influences of Copolymer Polyol on Structural and Viscoelastic Properties in Molded Flexible Polyurethane Foams. Journal of Applied Polymer Science, vol. 78, 766-786 (2000).
Bianchi, M. et al., Novel generation of auxetic open cell foams for curved and arbitrary shapes. Acta Materialia 59 (2011) 686-691.
Chan N. and K.E. Evans, Fabrication methods for auxetic foams. Journal of Materials Science 32 (1997) 5945-5953.
Wang, Y., Influence of Cell Size on Re-Entrant Transformation of Negative Poisson's Ratio Reticulated Polyurethane Foams. Butenhoff, A. Cellular Polymer 2001, 20, 373-385.
Friis, E.A. et al., Negative Poisson's ratio polymeric and metallic foams. Journal of Materials Science 23 (1988) 4406-4414.
Choi, J.B. and R. S. Lakes. Non-linear properties of polymer cellular materials with a negative Poisson's ratio. Journal of Materials Science 27 (1992) 4678-4684.
Bianchi, M. et al., Physical and thermal effects on the shape memory behaviour of auxetic open cell foams. J. Mater Sci. (2010) 45:341-347.
Bianchi, M. et al., Density change during the manufacturing process of PU-PE open cell auxetic foams. Phys. Status Solidi B 248, No. 1, 30-38 (2011).
McDonald, S.A. et al., In situ three-dimensional X-ray microtomography of an auxetic foam under tension. Scripta Materialia 60 (2009) 232-235.
Critchley, R. et al., A review of the manufacture, mechanical properties and potential applications of auxetic foams. Phys. Status Solidi B 250, No. 10, 1963-1982 (2013).
Mizumoto, Tomohiro et al., $CO_2$-Induced Stereocomplex Formation of Stereoregular Poly(methylmethacrylate) and Microcellular Foams. Macromolecules 2000, 33, 6757-6763.
Grima, J. et al., A Novel Process for the Manufacture of Auxetic Foams and for Their re-Conversion to Conventional Foam. Advanced Engineering Materials 2009, 11, No. 7, pp. 533-535.
Li, Yan and Changchun Zeng, On the successful fabrication of auxetic polyurethane foams: Materials requirement, processing strategy and conversion mechanism. Polymer 87 (2016) 98-107.
Li, Yan and Changchun Zeng, Room-Temperature, Near-Instantaneous Fabrication of Auxetic Materials with Constant Poisson's Ratio over Large Deformation. Adv. Mater. 2016, 28, 2822-2826.
Smith, C.W. et al., A Novel Mechanism for Generating Auxetic Behaviour in Reticulated Foams: Missing Rib Foam Model. Acta mater. 48 (2000) 4349-4356.
Gaspar, N. et al., Novel honeycombs with auxetic behaviour. Acta Materialia 53 (2005) 2439-2445.
International Search Report and Written Opinion issued by the International Searching Authority dated Nov. 6, 2015 for corresponding international patent application PCT/US2015/041713.
International Preliminary Report on Patentability issued by the International Preliminary Examining Authority dated Sep. 23, 2016 for corresponding international patent application PCT/US2015/041713.
Andersson, Anna et al., Shear Behavior of Flexible Polyurethane Foams Under Uniaxial Compression. Journal of Applied Polymer Science, vol. 111, 2290-2298 (2009).
Armistead, James Paul and Garth L. Wilkes. Morphology of Water-Blown Flexible Polyurethane Foams. Journal of Applied Polymer Science, vol. 35, 601-629 (1988).
Nawaby, A. Victoria et al., Polymer-CO2 systems exhibiting retrograde behavior and formation of nanofoams. Polym Int. 56:67-73 (2007).
First Office Action dated Aug. 2, 2018, by The State Intellectual Property Office of the People's Republic of China for corresponding Chinese Patent Application No. 201580041085.5, and English translation thereof.
Second Office Action dated Apr. 3, 2019, by The State Intellectual Property Office of the People's Republic of China for corresponding Chinese Patent Application No. 201580041085.0.
English Translation of Second Office Action dated Apr. 3, 2019, by The State Intellectual Property Office of the People's Republic of China for corresponding Chinese Patent Application No. 201580041085.0.

\* cited by examiner

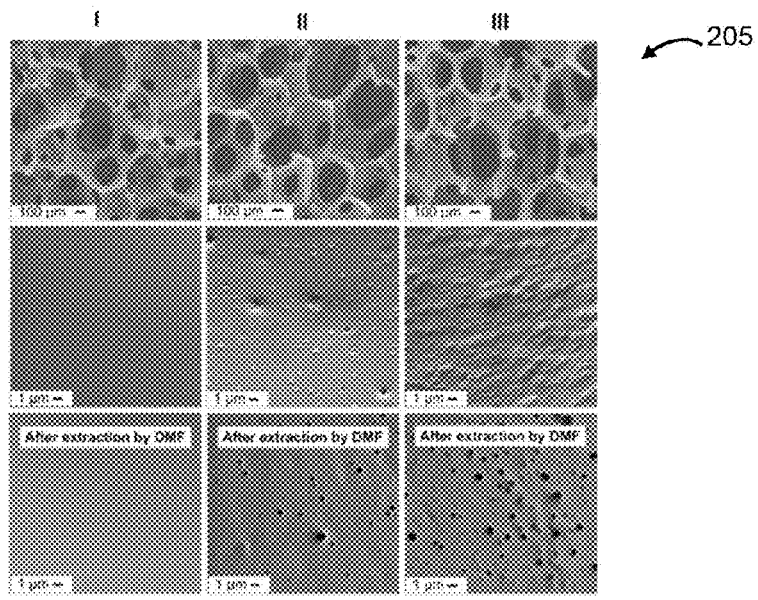
FIG. 5
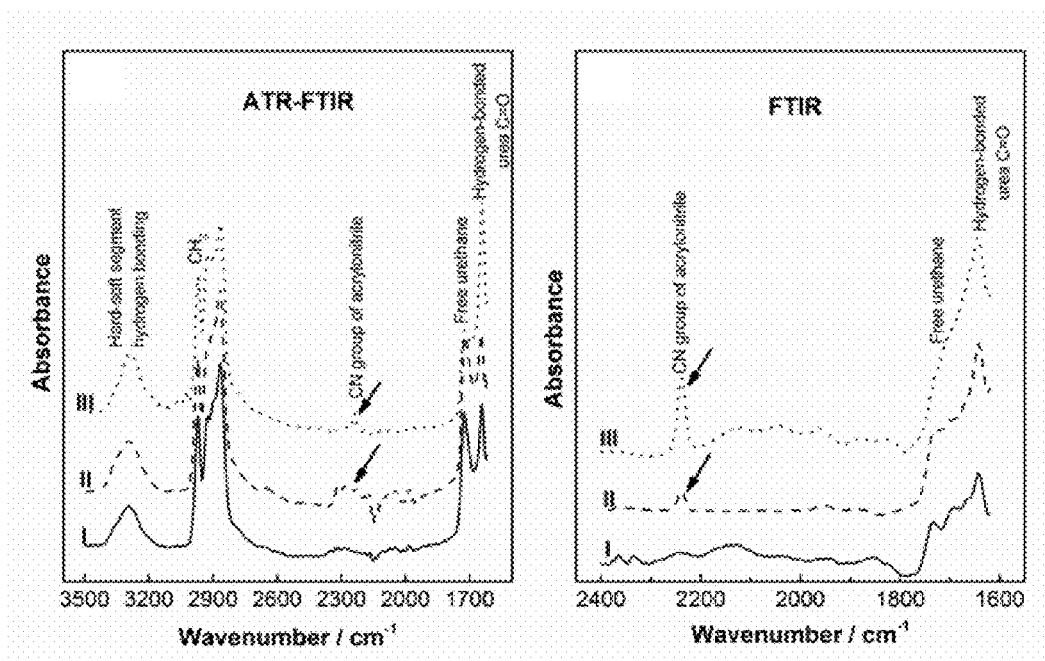
FIG. 6A
FIG. 6B

MATERIAL SYSTEMS AND METHODS OF MANUFACTURE FOR AUXETIC FOAMS

REFERENCE TO RELATED APPLICATIONS

The present application is a continuation of and claims priority to International Patent Application No. PCT/US2015/041713 filed Jul. 23, 2015, entitled, "Material Systems and Methods of Manufacture for Auxetic Foams." which claims priority to provisional U.S. Patent Application Ser. No. 62/029,225 filed on Jul. 25, 2014, entitled, "Auxetic Foams and Methods of Manufacture," which is hereby incorporated by reference in its entirety.

BACKGROUND OF THE INVENTION

Field of the Invention

This invention relates, generally, to polymeric foams. More specifically, it relates to polymeric foams exhibiting auxetic properties and methods of manufacture.

Brief Description of the Prior Art

Auxetics refer to a family of materials possessing negative Poisson's ratio (v) (the fraction of expansion divided by the fraction of compression for a material that is compressed in one direction while expanding in two other directions). [1-4] These materials expand laterally during stretching, and shrink under compression. [1-4] Although such materials had been proposed in the literature at the beginning of last century, they did not attract much attention at that time, because they are rarely found in nature. [5] In 1987, Lakes et al. first reported the manufacturing of artificial auxetic materials in their pioneering work. [1] Their findings created significant interest in the development of auxetic materials because of the novel properties and promising application potential they exhibited, such as enhanced indentation resistance for applications in protective equipment [6-8], improved bending stiffness and shear resistance for structural integrity construction elements [9-13], optimal dynamics, acoustic and dielectric properties for damping application and wave absorbers [14-17], etc.

A particular class of auxetic materials that has been developed is that of auxetic polyurethane (PU) foams manufactured from conventional flexible PU foams via a typical thermal mechanical process as illustrated in FIG. 1. [1, 18-22] Essentially, this process, first proposed by Lakes et al., involves applying triaxial compression on the pristine foam 105 to buckle the cell struts and induce the re-entrant morphology. The compressed foam was then heated above the softening temperature of the polymer, followed by cooling in the compression state to fix the intended re-entrant structure 110. [11,23,24]

In the past, there have been many efforts to explore the effects of fabrication parameters on the structure and properties of auxetic PU foams, in order to control the manufacture process more efficiently. [1,10,20,24-30] Also, attempts have been made to develop a scale-up manufacture process. [24,31] One might conclude that the fabrication process is no longer the obstructive element in the development of auxetic PU foams in regard to the apparent simplicity of the over principle in the manufacture process, and great effort devoted in this field. However, this statement should be considered with caution, because large discrepancies are found in the reports given by various authors. For example, published studies have shown that both processing temperature and heating time varied in extremely wide ranges of 130-220° C. and 6-60 min respectively, while no connections between them were observed (see a recent review by Critchley et al. [32]). It has been argued that the discrepancies can be attributed to the variances in equipment employed in each individual research and macroscopic cellular structure (e.g., cell size) of PU foams. Surprisingly, few studies have considered the variance in chemistry and microstructure of original materials as a critical factor.

Still, although the manufacturing of auxetic PU foams has been known for almost three decades, the fabrication of auxetic PU foams is a time-consuming, trial-and-error, and user-dependent process. Several critical issues remain unresolved. The criteria for the selection of suitable flexible PU foams for auxetic manufacturing have not been established. The methodologic principle relevant to defining the softening temperature is not yet clear. The identification of optimum heating temperature and heating time is still the subject of controversy between authors.

The manufacture of auxetic PU foams from conventional PU foams generally involves three steps: volumetric compression, followed by heating beyond the softening temperature and then cooling in the compression state. [10,18-20, 22,24,26-30,32] Although this approach is simple and the procedure is convenient to operate, it suffers from an inherent heat-transmission problem due to thermal insulation properties PU foams exhibit (thermal diffusivity, $\alpha$, $\sim 1 \times 10^{-7}$ $m^2/s$-$9 \times 10^{-7}$ $m^2/s$) [43]. This problem can be illustrated by considering the characteristic heating time $t=l^2/\alpha$, which shows significant increase when sample size (l) increases. [57] Another drawback of this method is that the auxetic foams produced using this approach show a non-uniform microstructure and irregular properties because of the existence of unavoidable temperature gradient during manufacture. Thus this thermal-mechanical technique appears to be difficult to scale-up for commercial applications. On the other hand, the chemical-mechanical method relying on acetone has been proposed by Grima et al. [55] Auxetic PU foams were fabricated by placing compressed PU foams in acetone at room temperature and then air drying. It was discovered that such method can produce more homogeneous auxetic foams and enables creation of larger samples in technique. [55,56] However, this technique is of limited practical use because this technique requires large amounts of volatile organic solvent as processing aids, which needs to be subsequently removed. The complete removal of the solvent, which is essential for the product performance, is both time and energy intensive. All these add a great deal of cost and process complexity.

SUMMARY OF THE INVENTION

Various embodiments may comprise a method for producing an auxetic foam. A flexible foam may be provided, which may have an initial volume and may comprise a plurality of cells. The flexible foam may comprise a soft domain, a hard domain, and a filler polymer. The foam may be placed into a pressure chamber. The foam may be compressed to a compressed volume that is less than the initial volume. The cells of the foam may be deformed when the foam is compressed. The compressed foam may be exposed to a compressed gas within the pressure chamber. The pressure chamber may be maintained at a predetermined temperature and pressure for a predetermined time. At least a portion of the compressed gas may dissolve into the filler polymer. The dissolved gas may reduce a glass transition temperature of the filler polymer such that the filler polymer transitions from a glassy state to a rubbery state. Thereafter the pressure may be relieved and allowed to reach atmospheric pressure before removing the foam from the chamber, such that the filler polymer transitions from the rubbery state to the glassy state, thereby fixing the cells of the foam in the deformed state.

Additional embodiments may comprise a method for producing an auxetic foam. A flexible foam may be provided. The flexible foam may have an initial volume and may comprise a plurality of cells. The flexible foam may comprise a soft domain, a hard domain, and a filler polymer. The foam may be placed into a pressure chamber. The foam may be compressed to a compressed volume that is less than the initial volume. The cells of the foam may be deformed when the foam is compressed. The compressed foam may be exposed to carbon dioxide within the pressure chamber. The pressure chamber may be maintained at a predetermined temperature and pressure for a predetermined time. At least a portion of the carbon dioxide may dissolve into the filler polymer. The dissolved carbon dioxide may reduce the glass transition temperature of the filler polymer such that a shape of the filler polymer transitions from generally spherical to generally ellipsoidal. Thereafter the pressure may be relieved and allowed to reach atmospheric pressure before removing the foam from the chamber, such that the filler polymer retains the generally ellipsoidal shape, thereby fixing the cells of the foam in the deformed state.

Still further embodiments may comprise a method for producing an auxetic foam. A flexible foam may be provided. The foam may have an initial volume and may comprise a plurality of cells. The flexible foam may comprise a soft domain having a first glass transition temperature, a hard domain having a thermal transition temperature greater than the first glass transition temperature, and a filler polymer. The filler may have a second glass transition temperature greater than the first glass transition temperature and less than the thermal transition temperature. The foam may be placed into a pressure chamber and compressed to a compressed volume that is less than the initial volume. The cells of the foam may be deformed when the foam is compressed. The compressed foam may be heated within the pressure chamber to a temperature greater than the second glass transition temperature and less than the thermal transition temperature. The compressed foam may be held at the temperature for a predetermined time. The compressed foam may be allowed to cool while remaining in the pressure chamber to a temperature less than the second glass transition temperature. The foam may be removed from the pressure chamber, thereby fixing the cells of the foam in the deformed state.

Yet other embodiments may comprise a material system for the production of auxetic foams. The material system may comprise a bulk matrix which in turn comprises a soft domain comprising a polymer chain and having a first glass transition temperature. The bulk matrix may further comprise a hard domain covalently or non-covalently linked to the polymer chain of the soft domain and having a thermal transition temperature greater than the first glass transition temperature. The material system may also comprise a filler polymer dispersed in the bulk matrix. The filler polymer may have a second glass transition temperature greater than the first glass transition temperature and less than the thermal transition temperature.

BRIEF DESCRIPTION OF THE DRAWINGS

For a fuller understanding of the invention, reference should be made to the following detailed description, taken in connection with the accompanying drawings, in which:

FIG. 5 illustrates various cross-sectional SEM images of flexible PU foams.

FIG. 6A is a graph of the ATR-FTIR spectra of flexible PU foams.

FIG. 6B is a graph of the FTIR spectra of the extrations of flexible PU foams by DMF.

DETAILED DESCRIPTION OF THE PREFERRED EMBODIMENT

Figure 1:
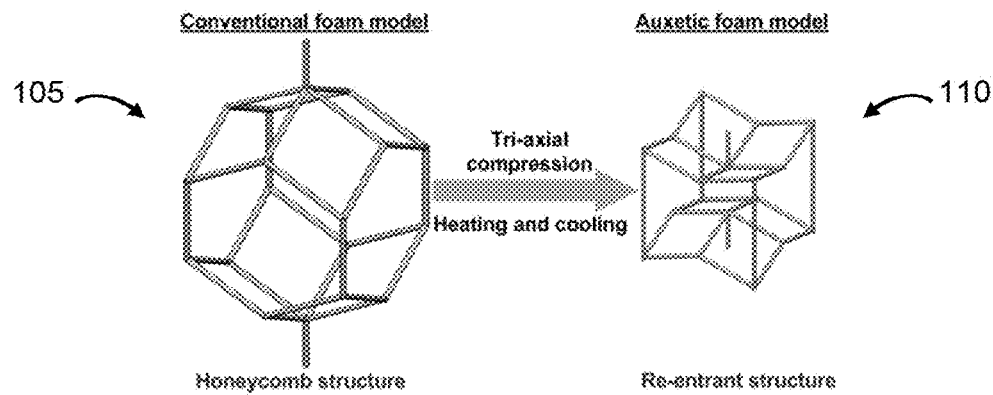
FIG. 1 is a schematic illustration of the structure conversion from conventional foams to auxetic foams.

Various embodiments as disclosed herein may comprise material systems as the starting materials for auxetic foam fabrication. The material system may comprise multiphase, multicomponent open cell polymer foams. Further embodiments may comprise methods for producing auxetic foams using these starting materials.

A foam may comprise two parts: a bulk matrix polymer part (non-porous part) and a voided part (the porous part or the space (cells) contained in the foam). The bulk matrix of the system may comprise a hard domain providing strength and a soft domain providing deformation capability. For a PU foam (produced by reacting an isocyanate with a polyol), the soft domain may comprise long polymer segments derived from the polyols. The longer the soft domain polymer, the lower the force required to deform the PU foam, and the larger deformation the PU foam can undergo. The hard domain may comprise isocyanate covalently or non-covalently linked to the soft domain polymer. Shorter soft domain polymers with higher levels of crosslinking leads to more rigid and tougher foams.

The bulk matrix may further comprise a third component, referred to as a filler polymer, as a dispersed phase (third domain) in the bulk matrix. The filler polymer may have different mechanical properties and may have different glass transition temperatures that all lie between those of the hard and soft domains. In various embodiments, the type and concentration of the filler polymer in the bulk matrix may be varied to tailor mechanical and thermal properties of the final auxetic foam. The deformation of the filler polymer under temperature-time history may dictate the fixation of the auxetic foam structure and the Poisson's ratio of the foam.

Depending on the combination of the three primary components (i.e., hard domain, soft domain, and filler polymer), auxetic foams with a wide range of mechanical properties (such as strength, modulus, and elongation) and Poisson's ratio may be produced. In addition, the thermal stability of the auxetic foam may be varied by the primary component selection.

In various embodiments, the filler polymer may comprise, for example, styrene acrylonitrile (SAN), polyether sulfone (PES), polysulfone, cyclic olefin copolymers (COC), acrylonitrile-butadiene-styrene (ABS), poly(p-phenylene oxide (PPO), poly(ether ketone (PEK), poly(ether ether ketone) (PEEK), poly(ether ketone ketone) (PEKK) or mixtures thereof.

Auxetic foams may be produced by first mechanically compressing the material system (PU foam) to a predetermined volume compression ratio. The mechanical compression deforms the cells of the foam. While maintaining compression, the material system may heated to a temperature above the glass transition temperature of the filler polymer and below a thermal transition temperature (which may be, for example, a glass transition temperature, a melting temperature, or a solidification temperature) of the hard domain, allowing the filler polymer to transition from a glassy state to a rubbery state which in turn allows the filler polymer to deform. The material system may remain at the desired temperature for a period of time, then allowed to cool to room temperature. As the material system cools below the glass transition temperature of the filler polymer, the filler polymer transitions back to the glassy state which permanently fix the shape of the filler polymer. This in turn fixes the cell deformation and overall foam shape. The mechanical compression is then released. The material produced is an auxetic foam resulting from the filler polymer fixing the foam cells in the deformed state when the filler polymer transitions back to the glassy state. The deformation of the filler polymer under temperature-time history may dictate the fixation of the auxetic foam structure and the Poisson's ratio of the foam.

Additional embodiments may comprise subjecting the material system to a compressed gas that can be dissolved from a few tenths of a percent by weight to several tens of percent by weight, resulting from favorable polymer-gas intermolecular interaction. Exemplary gases include carbon dioxide, nitrogen, or any volatile organic chemical. The dissolved gas generates additional free volume and increase the mobility of the polymer chains of the filler polymer, resulting in a reduction of the glass transition temperature of the filler polymer, whose value can be either experimentally measured or calculated theoretically. In addition to the list of exemplary filler polymers presented above, the filler polymer may comprise any polymer in which the compressed gas has substantial solubility.

Because the glass transition temperature of the filler polymer is the minimum temperature required to allow the filler polymer to be deformed to new permanent shapes under mechanical compression, and is depressed by the dissolved gas, the material system may be heated to a lower temperature than would be necessary without dissolving the gas in the filler polymer, to cause the filler polymer to deform under mechanical compression and relax to the deformed shape. Moreover, because of the greatly increased polymer chain mobility resulting from the dissolved gas, polymer chain relaxation under mechanical stress, which is the molecular mechanism for the filler polymer to achieve new shapes under mechanical compression, can be greatly accelerated. That is to say under the same temperature, the time needed to reach the same deformation of filler polymer is much shorter with dissolved gas than would need without the dissolved gas. Therefore by using compressed gas it is possible to manufacture auxetic foams at lower temperature with reduced amount of time. Both are of tremendous benefit for large scale manufacturing of auxetic foam in a cost effective way. Polymers and polymer foams are insulators, and heating them up takes a long time and consumes a large amount of energy, most of which are wasted during the lengthy heating process. Reduced requirement for the manufacturing temperature therefore leads to significant energy savings and manufacturing time reduction. Moreover, because the polymer foams and polymers are very poor in heat transfer, a higher manufacturing temperature not only consumes more energy, but also leads to more non-uniform temperature distribution throughout the foams. The non-uniformity becomes more severe when the product size becomes larger. Such temperature non-uniformity has extreme detrimental effect on the product quality, ultimately limiting the size of the product that can be produced (typically very small and very thin). By lowering the manufacturing temperature by using compressed gas, this difficulty can be greatly alleviated, which allows for manufacturing of larger size product. The type of the compressed gas and the pressure can be judicious selected for the particular filler polymer, such that the manufacturing temperature may be close or equal to room temperature, completely eliminating the need for heating and associated equipment cost. Furthermore, since the compressed gas may have high diffusivity and very short distance to diffuse from the outer surface of the matrix polymer to the filler polymer within, the manufacturing time can be further reduced to minutes or even seconds. For example, for a PU foam system in which SAN is the filler polymer, we have used carbon dioxide as the compressed gas, and were able to manufacture auxetic foam with Poisson's ratio of −0.5 at room temperature using a manufacturing time as short as less than 1 minute. See FIG. 21A, and the discussion below for details.

Chemistry and Structure of Auxetic Foams

Figure 2:
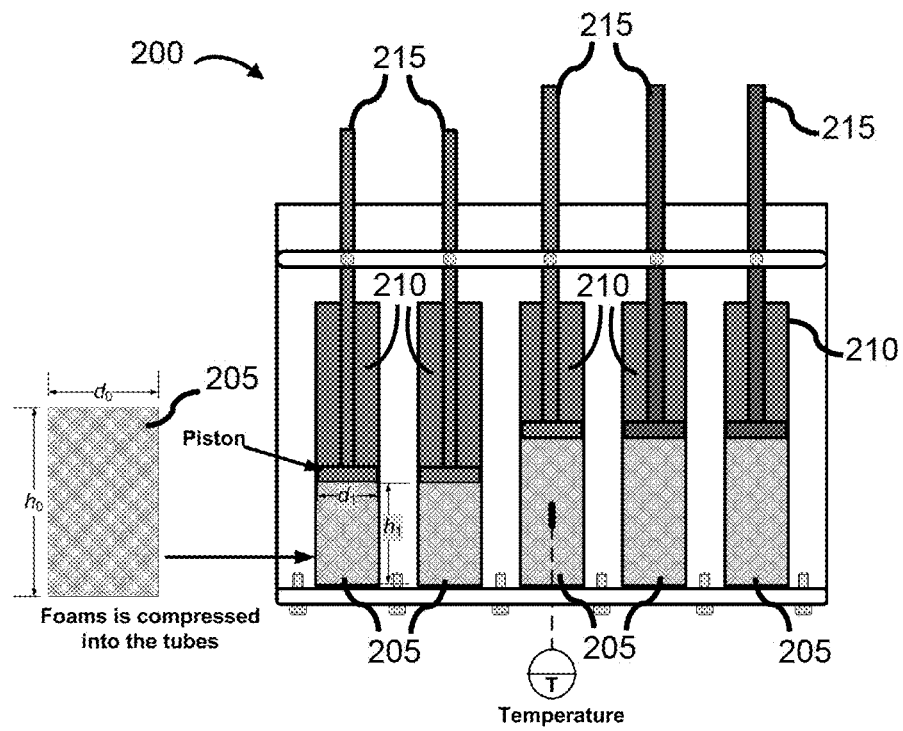
FIG. 2 illustrates a schematic diagram of auxetic foam manufacture.

Three commercial open-cell, flexible PU foams with nominal cell diameter of 480 μm were obtained (referred to herein as I, II and III). The densities of the foams were 44.8 kg/m$^3$, 44.8 kg/m$^3$ and 48.1 kg/m$^3$, respectively. They were dried in an air-flow oven at 80° C. for at least 12 h before use. Auxetic foams were fabricated by a thermo-mechanical process, as illustrated in FIG. 2. [19,22] Samples of the foam 205 with initial dimensions of 32 mm diameter ($d_0$) and 80 mm length ($h_0$) were placed into a metallic tube 210 (i.e., a pressure chamber) of mold 200 and compressed by a piston 215 to 20 mm diameter ($d_1$) and 50 mm length ($h_1$) as shown in FIG. 2. The mold 200 was then placed into an oven with forced convection, of which the temperature can be controlled with an accuracy of ±0.3° C. (FED 115, Binder GmbH, Germany) at test conditions for a constant time. The mold 200 was then removed from the oven and cooled at room temperature for 1 h. Finally, the foams 205 were taken out of the mold and stretched in the axial directions. The stiffer ends of the specimens 205 were cut.

Sol/Gel Analysis

Foam samples 205 approximately 2 g were immersed in 500 ml of dimethylformamide (DMF). After 48 h, the solvent swollen samples 205 were removed from the DMF/sol fraction solutions and dried in a vacuum oven at 40° C. for 24 h and then at 80° C. for an additional 24 h. The dried extracted samples 205 were then weighed to determine the sol fraction of each sample 205. Values of the soluble fraction for foams I, II and III from the solvent extraction experiments were found to be 5 wt %, 9 wt % and 18 wt % respectively.

Scanning Electron Microscope (SEM)

The morphologies of foam samples 205 were investigated using field emission scanning electron microscope (SEM) (JEOL 7401F). Samples 205 were cut using a knife and the fracture surface was sputter-coated with a thin layer of gold before observation.

Infrared Analysis

Fourier transform infrared (FTIR) spectra were performed by a Nicolet NEXUS 470 FTIR-spectrometer (Thermo Ltd.) with the KBr pellet technique in a range from 4000 to 400 cm$^{-1}$ at a resolution of 4 cm$^{-1}$. Data were collected as average of 32 scans. FTIR with attenuated total reflectance (ATR) spectra, were carried out in a spectral range from 4000 to 650 cm$^{-1}$ utilizing a Smart Golden Gate reflectance attachment and recorded 64 scans at a resolution of 2 cm$^{-1}$. All spectra had been normalized using the $CH_2$ peak at 1969 cm$^{-1}$ as an internal reference peak.

Dynamic Mechanical Analysis (DMA)

The 7 mm×7 mm×25 mm rectangular foam samples 205 were machined using a $CO_2$ laser (VersaLASER, Universal Laser Systems). DMA was studied by a TA Instruments Q800 Dynamic Mechanical Analyzer in tension model using a deformation of 0.2% strain, a frequency of 1 Hz, a force track of 150%, and a preload force of 0.05 N. The test was run in the temperature range of −100 to 200° C. using a heating rate of 1° C./min.

X-Ray Scattering

Simultaneous small- and wide-angle X-ray scattering (SAXS/WAXS) measurements were obtained using a Bruker NanoSTAR system, operating at 45 kV and 650 mA with Iµs microfocus X-ray source (the wavelength of Cu Kα, λ=0.15412 nm). The SAXS pattern was recorded by a HiStar 2D multi-wire area detector. The WAXS pattern was recorded by a Fuji Photo Film image plate and the plate was read with a Fuji FLA-7000 scanner. In the WAXS measurement, the distance between the image plate and the sample stage was 50 mm. A 600 s exposure time was used for collecting the SAXS and WAXS scattering patterns for samples. The foam samples 205 were cut 6 mm thickness and compressed to 2 mm thickness.

Uniaxial Compression Testing

The compression experiments were conducted using a TA Instruments Q800 Dynamic Mechanical Analyzer in compression mode with a 15 mm compression clamp at a strain rate of 0.01 min$^{-1}$ and 30° C. The disk foam sample 205 which was 15 mm in diameter and 5 mm thick was machined using a $CO_2$ laser (VersaLASER, Universal Laser Systems).

Structural Convertibility Characterization

Structural convertibility properties of the foam 205 were quantified via strain-controlled compression tests performed on a ARES-LS3 rheometer with 25 mm parallel plate fixture (TA instruments). The disk foam samples 205, with a diameter of 25 mm and a thickness of 10 mm, were machined using a $CO_2$ laser (VersaLASER. Universal Laser Systems). The samples 205 were then heated to the testing temperature and allowed to equilibrate for 10 min, and then compressed to a strain of 40% or 70% at a rate of approximately 0.5 min$^{-1}$. The compressed samples 205 were then allowed to equilibrate at the testing temperature for different time. After cooling with strain at room temperature for an additional 10 min, the samples 205 were removed from the fixture and stored for 24 h to allow for the completion of the fast relaxation process. Finally, the sample thickness was measured, and the structural convertibility ($R_f$) was calculated using Equation 1:

$$R_f = \varepsilon/\varepsilon_{load} \quad \text{Eqn. 1}$$

where, ε is the strain after unloading and $\varepsilon_{load}$ is the initial loading strain. Values averaged from three separate measurements were used for calculation.

Measurement of Poisson's Ratio

Figure 3:
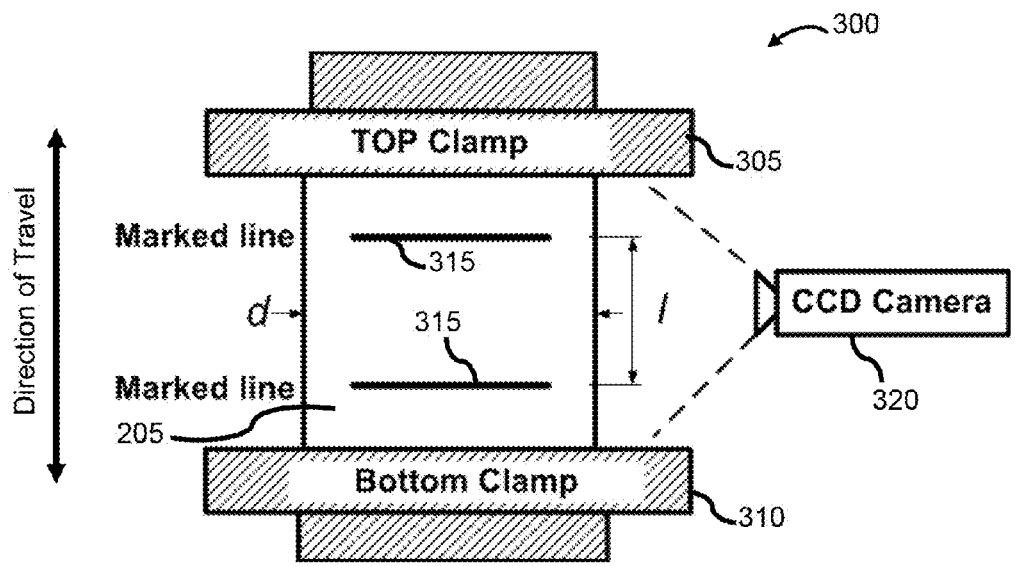
FIG. 3 is a schematic diagram of a video extensometer measurement of Poisson's ratio.

Measurement of Poisson's ratio of the foam samples 205 was based on video data acquired from a video extensometer system (Shimadzu DV-201) machine 300 in a tensile test. The foam sample 205 was coupled to a top clamp 305 and a bottom clamp 310 of the video extensometer system 300. Two spaced apart lines 315 were placed on the foam sample 205 perpendicular to a direction of travel of the clamps 305, 310. The tensile test was conducted using a strain rate of 6 mm/min and maximum strain of 10% (see FIG. 3). For the calculation of Poisson's ratio, video data obtained by camera 320 was first transformed into image data via the software MATLAB R2013b. Secondly, a MATLAB routine[34] was used to calculate the length (l) and diameter (d) of the sample for every image. Thirdly, the transverse strain ($\varepsilon_x$) and longitudinal strain ($\varepsilon_y$) were calculated, respectively, using Equations 2 and 3:

$$\varepsilon_x = \frac{\Delta l}{l_0} \quad \text{Eqn. 2}$$

$$\varepsilon_y = \frac{\Delta d}{d_0} \quad \text{Eqn. 3}$$

where, $l_0$ is the original length and $d_0$ is the original diameter. Finally, the average Poisson's ratio was calculated from the strain-strain curve by the classical definition of Poisson's ratio [34] given in Equation 4:

$$v = \frac{\varepsilon_x}{\varepsilon_y} \quad \text{Eqn. 4}$$

Effects of Chemistry and Structure on Auxetic Foam Production

Figure 4:
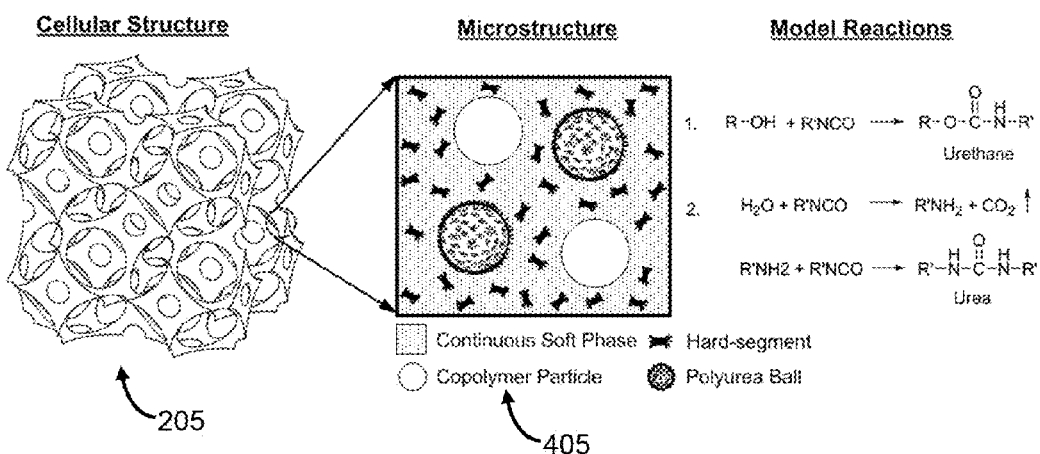
FIG. 4 is a diagram of the microstructures and compositions of flexible polyurethane foams.

Flexible PU foams 205 are chemically and structurally complex polymers formed from two competing reaction between a diisocyanate and both polyol and water. [35,36] FIG. 4 illustrates a typical two-level structure of flexible PU foams 205, which has been supported in numerous studies. [37-41] Besides the obvious macroscale cellular structure, flexible PU foams 205 show a dominant phase-separated microscopic structure 405, consisting of hard domains dispersed in a soft domain covalent matrix. Two additional structures can be sometimes observed in flexible PU foams 205. One is the large urea-rich aggregates or "urea balls" structure frequently found in flexible PU foams 205 prepared with high water concentration. [35,36] The other is the styrene and acrylonitrile copolymer (SAN) particles filled for the improvement of the load bearing property and cell openness of flexible PU foam 205. [41]

The structure of the flexible PU foams 205 was studied using SEM analysis. FIG. 5 shows the representative cross-sectional SEM micrographs of PU foams 205. All foams 205 presented similar cellular structure. However, a clear difference was found in SEM images taken at high magnification. The rib surface of both samples II and III appeared well dispersed spherical particles (~0.5 µm) while the rib surface of I was smooth. This difference can also be observed in samples treated by DMF. It is clear that in place of microspheres presenting in original foams 205 there are holes with a size similar to particles in both samples II and III, while no difference was found in sample I.

FIG. 6A shows the ATR-FTIR spectra of the original foams 205. In the NH stretching vibration region (from 3,150 to 3,500 cm$^{-1}$), all foams 205 show a peak around 3,295 cm$^{-1}$, which indicates the NH group forms a hard-soft domains hydrogen bond with ether oxygen (NH—O). [37] This indicates the existence of phase mixing between hard and soft domains. In the carbonyl (C=O) stretch region (from 1,600 to 1,800 cm$^{-1}$), all samples show two peaks. One is the peak at 1,720 cm$^{-1}$ which is assigned to the free urethane C=O. The other is the peak around 1,642 cm$^{-1}$ which indicates that most of urea C=O groups are associated in the ordered hard-hard domains hydrogen bond (NH—O=C). [37-39] This seems to contrast the analysis from the NH stretching; however, this discrepancy can, at least in part, be explained by coexistence of a homogeneous hard-soft domain mixing phase and ordered hard domains. Also notable is the much higher relative intensity of the ordered NH—O=C peak in III. This implies that III has a higher content of hard domains. An important point to notice in the spectra, is the nitrile (CN) peak of acrylonitrile centered at 2,240 cm$^{-1}$, which is clearly visible in II and III but not in I. This is a direct evidence for the presence of SAN fillers in II and III (SAN content: III>II).

Furthermore, as presented in FIG. 6B, the FTIR analysis of extractions by DMF shows that the amount of extractable SAN increases with the increasing of SAN loading in flexible PU foams 205. It can also be observed that the amount of the soluble hydrogen-bonded C=O (hard segment) in foams 205 follows the sequence III>II>I. These results suggest that the links of these SAN copolymers and hard domains to the soft domain matrix, which depend not only on chemical grafting, but also on physical means, such as hydrogen bonding. [40,41]

Figure 7:
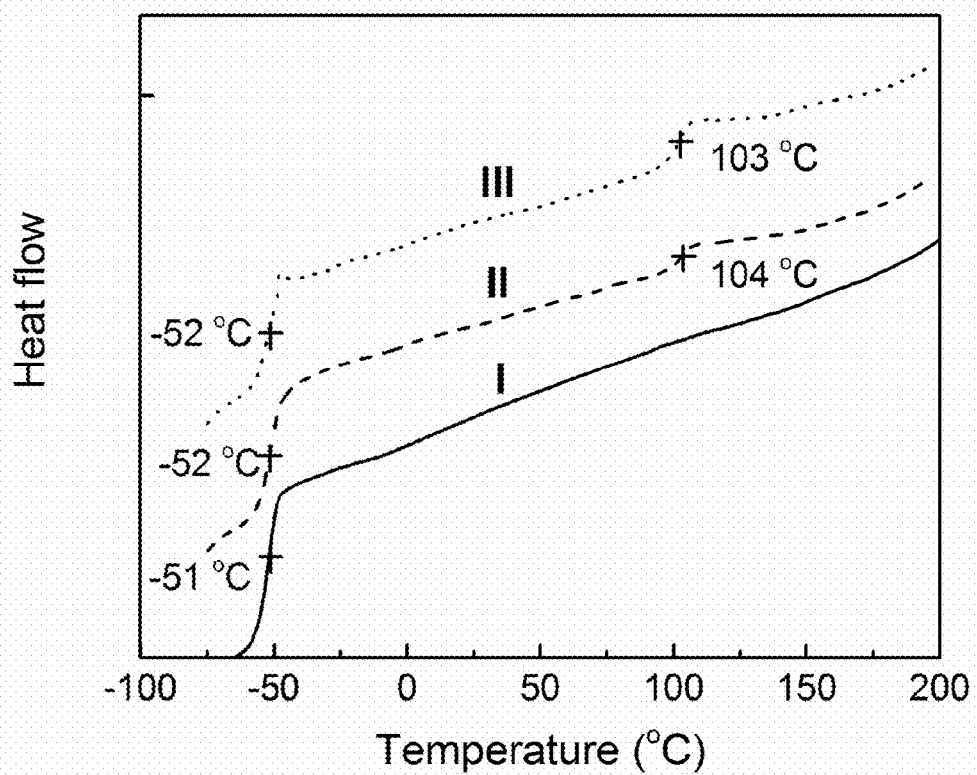
FIG. 7 is a graph of DSC thermograms for flexible PU foams.

FIG. 7 shows the DSC curves of these foams 205. Results show that no crystallinity was observed up to 200° C. This reveals that there are no signs of the presence of large size urea aggregates in these foams 205. All foams 205 show a soft domain glass transition temperature of about −50° C. (denoted as $t_{g,soft}$). [41] For II and III, a SAN glass transition temperature of about 105° C. (denoted as $T_{g,SAN}$) was observed. This agrees well with previous reports. [40-42]

Figure 8A:
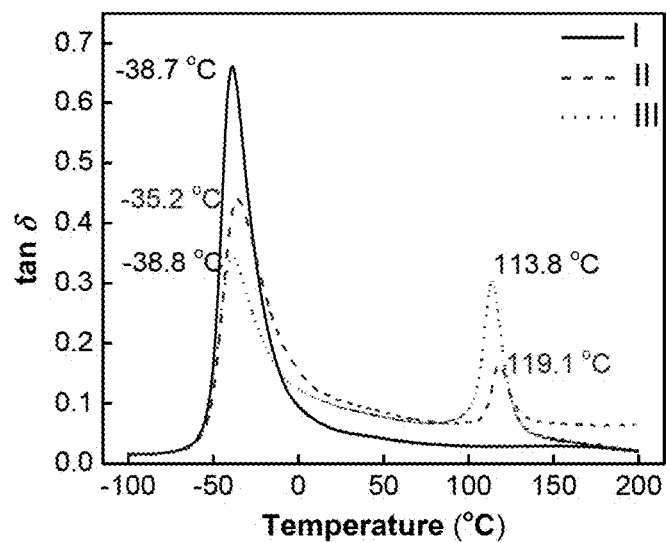
FIG. 8A is a graph of the loss factor (tan δ) peak.

To further probe the thermal mechanical properties of flexible PU foams 205, the DMA technique was applied. The loss factors (tan δ) were plotted as a function of temperature at a frequency of 1 Hz for temperature ranging from −100° C. to 150° C. (FIG. 8A). The plot relative to sample I exhibits a strong sharp peak at −38.7° C. (denoted as $T_{g,soft}$) which is attributed to the glass transition of soft domains. It is noted that this glass transition is greater than a pure soft polyol system (−55° C. by DMA at 1 Hz) [41], meaning a certain degree of hard- and soft-domain mixing which significantly restrict the chain mobility of soft domains. For II and III, two distinct peaks are observed in the tan δ curves: one is similar to that of I, which is ascribed to the soft domain glass transition (denoted as $T_{g,soft}$), and the other is at much higher temperature which is attributed to the SAN relaxation process (denoted as $T_{g,SAN}$). This is in reasonable agreement with the DSC results, although they are about 10-15° C. higher than the calorimetric values.

Figure 8B:
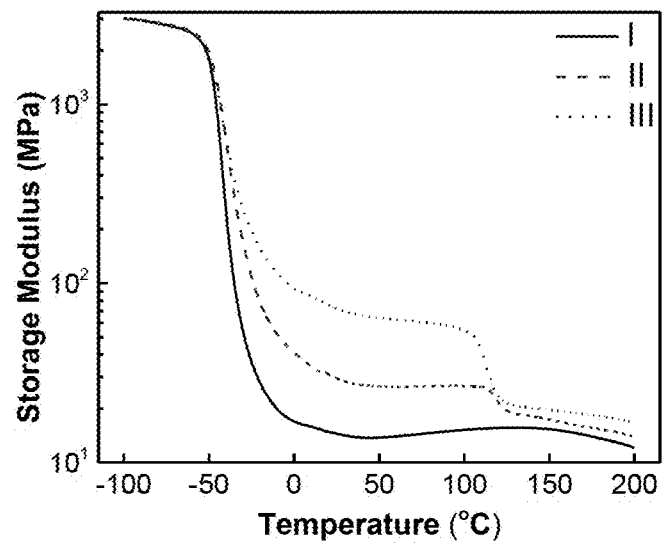
FIG. 8B is a graph of the normalized dynamic storage modulus for PU foams at 1 Hz and 1° C./min from −100° C. to 200° C.

Deconvolution of the effects of the cellular structure on the elasticity of materials was done by varying the storage modulus, but maintaining the value of the starting point in storage modulus curve at a constant value of 3×10$^9$ Pa. [40,43,44] The normalized storage modulus plots (FIG. 8B) show that the presence of SAN strongly increases the rubber plateau storage modulus. This illustrates the classical reinforcement effect of filler polymers. Thus, the volume fraction (c) of SAN for each sample in this study was estimated on the basis of the theory of filler polymer reinforcement to be 0 vol % (foam I), 11.8 vol % (foam II) and 31.6 vol % (foam III), using the Guth equation [45] (Equation 5):

$$E'=E_0(1+2.5c+14.1c^2) \qquad \text{Eqn. 5}$$

where $E_0$ is defined as $E(T_{g,SAN}+20\ K)$ and E* is defined as $E(T_{g,SAN}-20\ K)$.

Figure 9A:
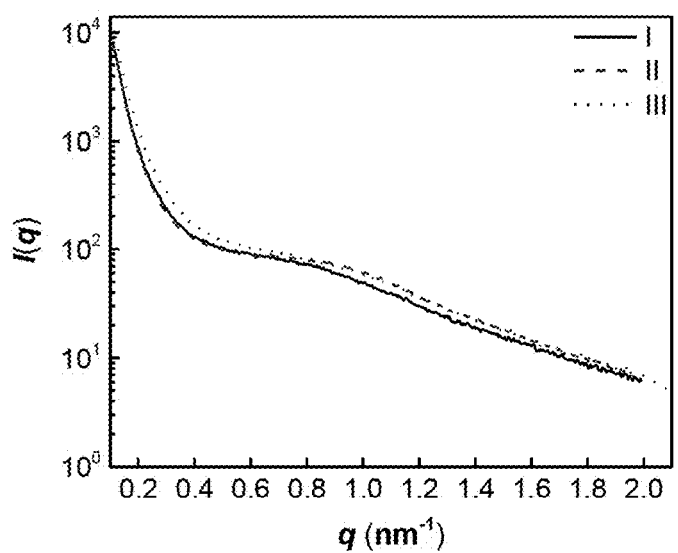
FIG. 9A is a graph of SAXS scattered intensity profiles.
Figure 9B:
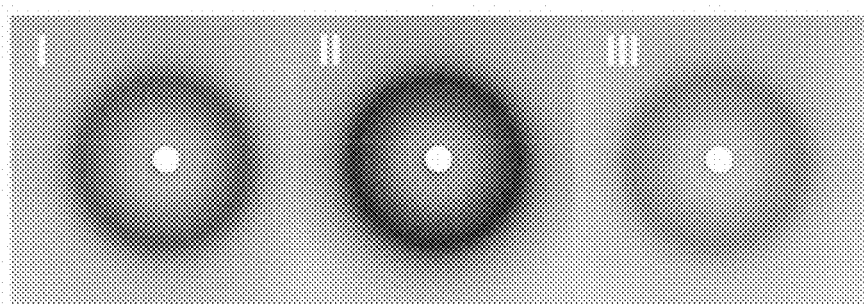
FIG. 9B illustrates WAXS patterns.

To complete the microstructure picture in flexible PU foams 205, simultaneous small and wide-angle scattering measurements were also employed. FIG. 9A shows the SAXS profiles for three foams 205 varying in the SAN particle content. All samples 205 display only a shoulder at 0.5-1 nm$^{-1}$ in the SAXS profiles. These results clearly suggest that there is the existence of phase separation, and also they provide indirect evidence for the weak interconnectivities between hard domains. [46] FIG. 9B shows the 2D WAXS patterns for the three foams 205. Only an amorphous halo at 2θ~20° was observed, which suggest that very little order exist in the hard domains of foams 205. [47]

Figure 9C:
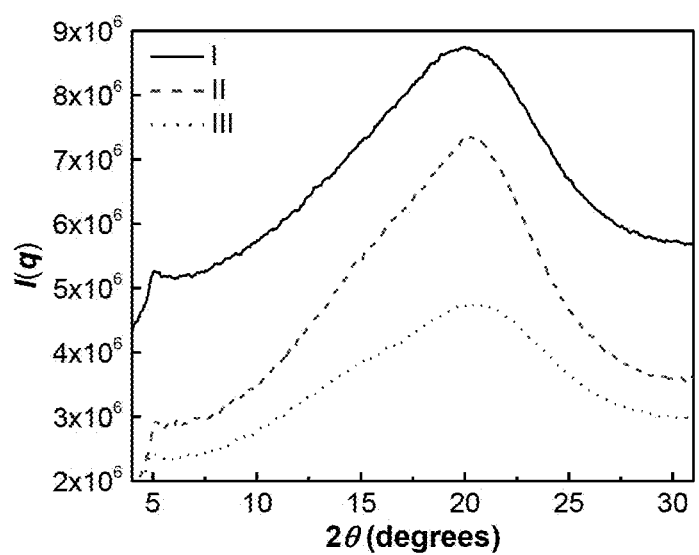
FIG. 9C is a graph of WAXS scattered intensity profiles for three flexible PU foams at 25° C.

The hard domain size estimated by the correlation length D using Scherrer equation (D≈kλ/β cos θ), [49] was found to be about 1 nm. This is far less than the smallest structural heterogeneity resolvable through $T_g$ measurements (~10 nm), [49] where k is a material parameter, commonly 1 for polymer. λ is the wavelength of the X-ray, and β is the full width at half-maximum of the WAXS peak (FIG. 9C). Note that from both SAXS and WAXS results, no noticeable difference in the three foams 205 can be found. This reveals that the incorporation of large size SAN particles on the phase separation structure is limited. Thus, the X-ray scattering experiments provided strong evidence of microphase separation structure in flexible PU foams 205 and a satisfying interpretation of the changes of soft domain $T_g$.

The analysis has so far shown a relative complete understanding on the chemistry and structure of these foams 205 by the combination of different techniques. It can be concluded that all flexible PU foams 205 exhibit complex phase separation structure with a large fraction of soft domains dissolved within the hard domains. It also shows that no large-size urea-rich aggregates are detected in these foams 205. For the SAN-containing foams (II and III), SAN filler polymers are embedded in a soft domain matrix by both chemical and physical crosslinkings.

Structural Convertibility

Figure 10:
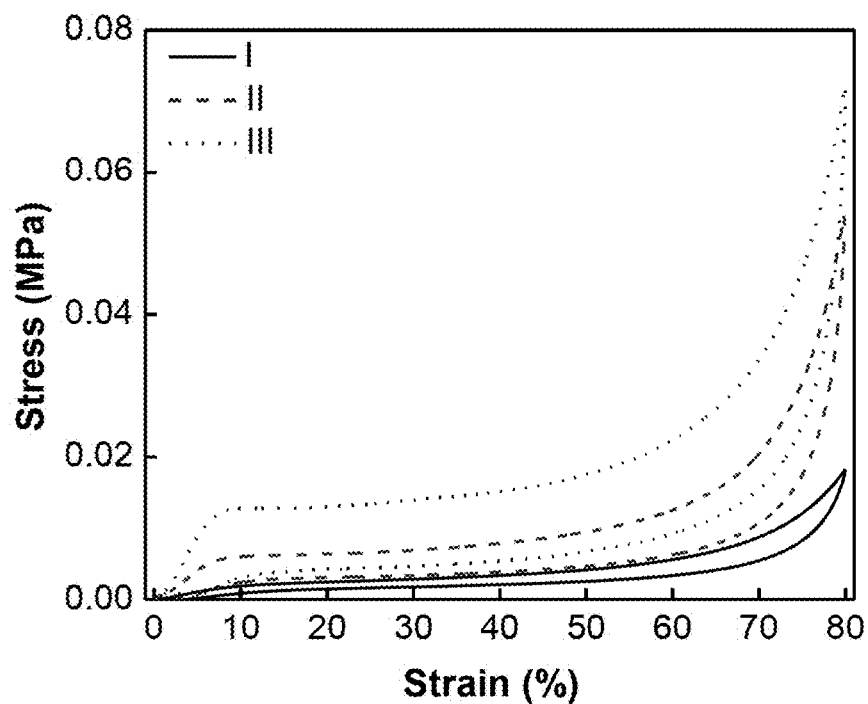
FIG. 10 is a stress-strain curve of polyurethane foams in compression at a strain rate 0.01 $min^{-1}$.

FIG. 10 presents typical compressive stress-strain curves for the flexible foams 205. It is found that the overall trend of the stress-strain curve is similar for all foams 205. Beyond an initial elastic region (<10% strain), they show a long collapse plateau region associated with buckling of the cell struts. This is followed by a densification regime at 60% strain in which the cell struts begin to contact with each other, resulting in a large upturn in stress. [43] FIG. 10 also illustrates the effect of SAN on the compression properties. In addition to the higher firmness, the SAN containing foams 205 also exhibit greater hysteresis, suggesting greater load relaxation. [50]

Figure 11:
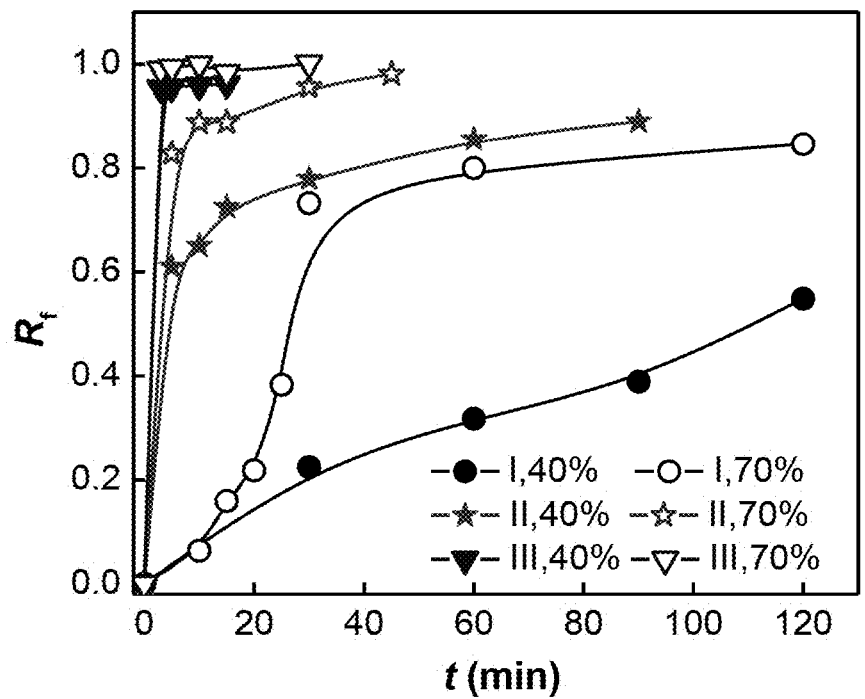
FIG. 11 is a graph of structural convertibility of the three foams at 135° C.

Two typical preloaded compressive strains of 40% (in collapse plateau region) and 70% (in densification regime) were selected for the study of structural convertibility. As shown in FIG. 11, the very distinct structural convertibility ($R_f$) was observed, with the increase of the SAN content and preloaded strain. In the case of I with low preloaded strain level (40%), the structural convertibility is directly ascribed to the hydrogen bonds. These bonds weaken as temperature increases and hard domain phase moves relative to the soft domain phase. When the temperature is reduced, the hard and soft domain phases will resume their hydrogen bonding interactions in the new deformed geometry. However, these forces are normally weak relative to the overall strength of the elastic matrix's restoring force, and also are easily affected by humidity. [39]

Figure 12:
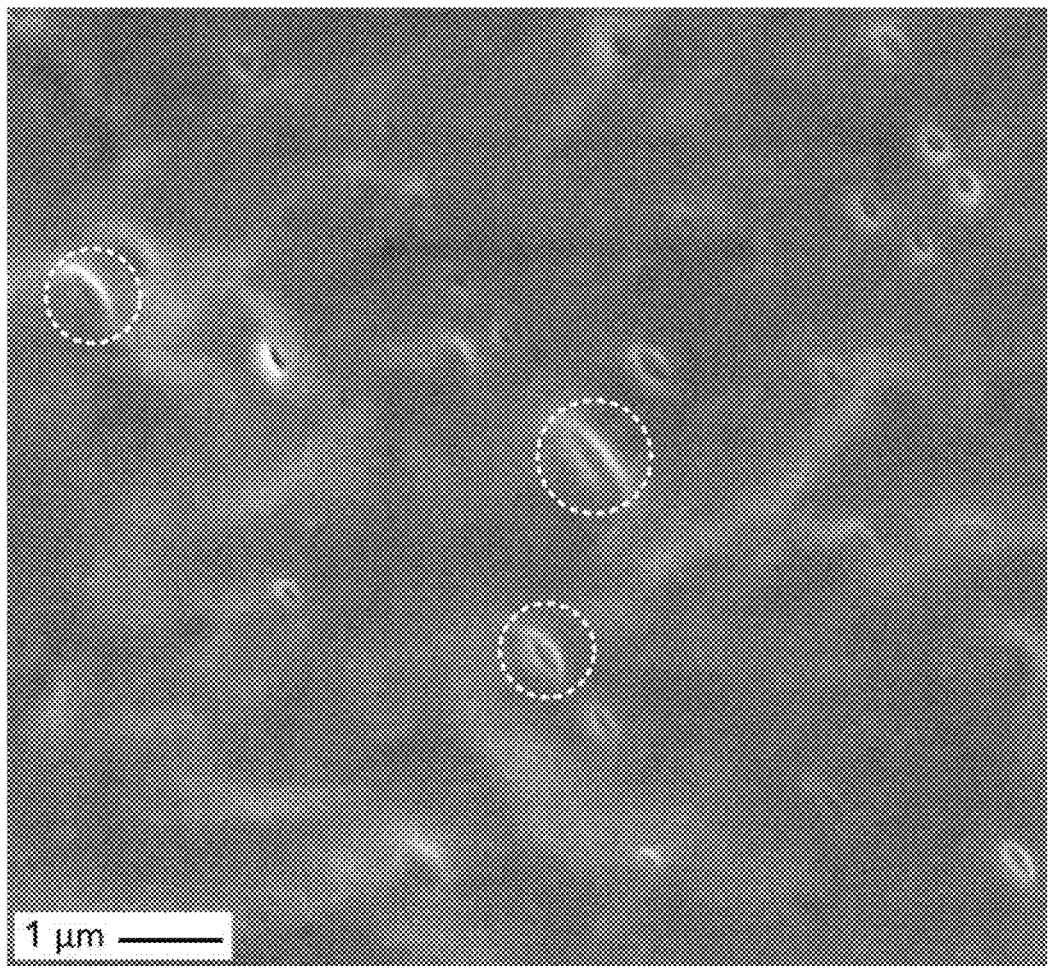
FIG. 12 is a SEM image of foam II after 70% compression at 135° C. for 30 min.
Figure 13:
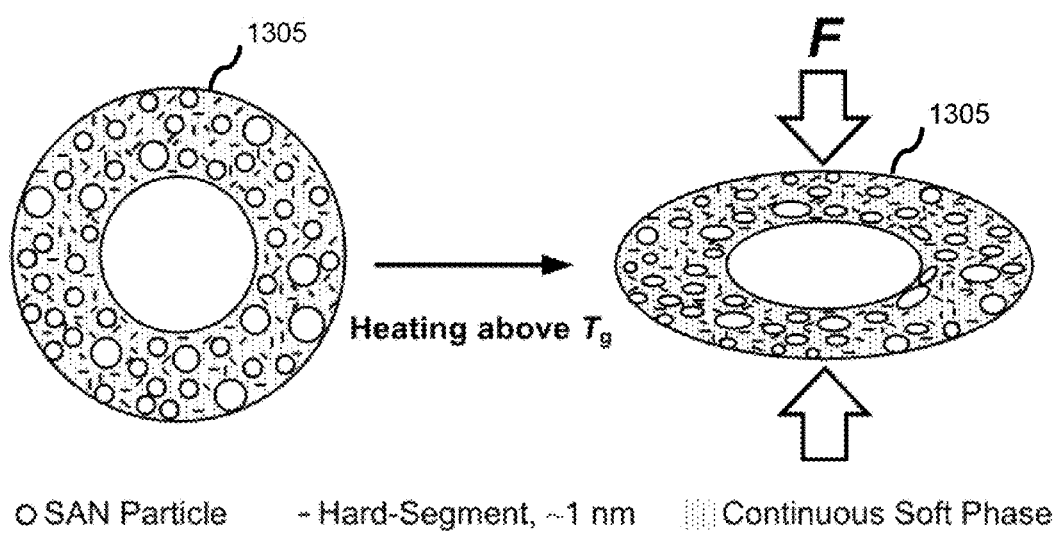
FIG. 13 is a schematic representation of basic deformation mechanism in SAN-containing polyurethane foams.

In addition to the hydrogen bonds, an important factor introduced for the structural conversion of II and III, is related to the temperature dependence of the SAN chain mobility or the relaxation process of SAN chains. These are quite evident from the SEM observation (FIG. 12). It is proposed that above the glass transition temperature, the SAN reinforcing filler polymers 1305 can relax quickly to be deformed from their general spherical shapes (as shown in FIG. 5), into generally ellipsoidal shapes (as shown in FIG. 13), in response to external force equilibrium. Cooling down below the glass transition temperature of SAN particles leads to vitrification of the new shape. Consequently, enhanced structural conversion would be expected. This is shown schematically in FIG. 13.

Also notable is higher structural convertibility values at higher preloaded strain for flexible PU foams 205. This enhanced structural convertibility might be assigned to the additional weak van der Waals interactions ("adhesion") between the cell surfaces, which is directly proportional to the surface contact areas between the cell ribs. In other words, this interaction can be considered to be negligible beyond the densification region as mentioned above.

Following the discussion above, it is perhaps surprising that the structural convertibility of flexible PU foams 205 is associated with different mechanisms which vary with the structure of foams and the processing conditions, e.g., temperature and strain dependence. However even more surprising is the result that the SAN particles filled in flexible PU foams 205 play the most important role in the structural conversion of these foams 205.

Figure 14A:
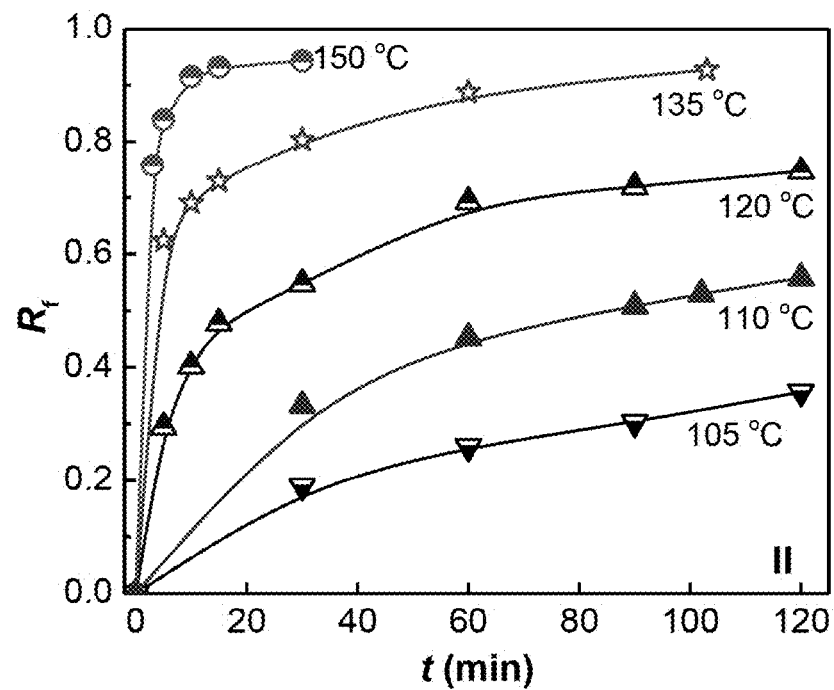
FIG. 14A is a graph of structural convertibility curve of PU foam II at different shape holding temperatures (shape strain 40%).
Figure 14B:
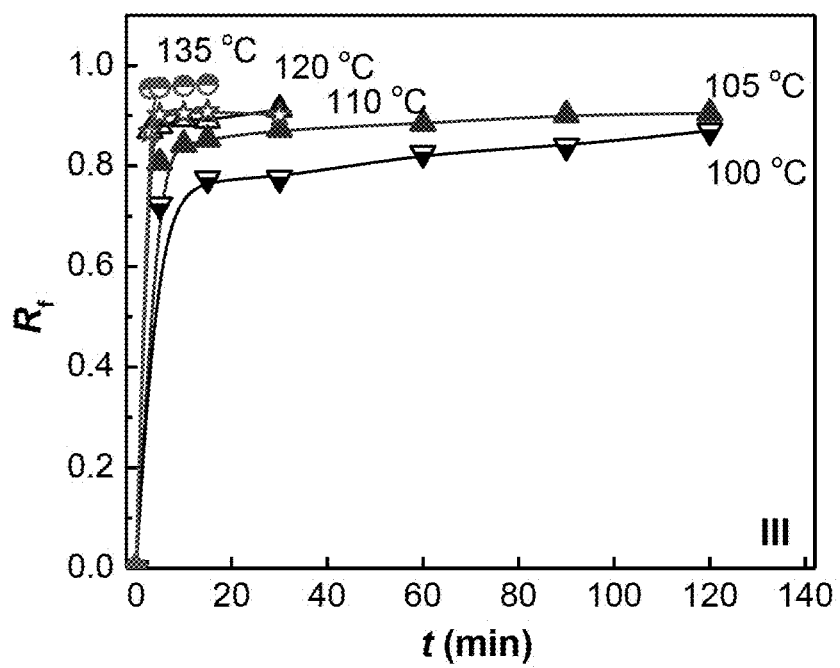
FIG. 14B is a graph of structural convertibility of PU foam III at different shape holding temperatures (shape strain 40%).
Figure 14C:
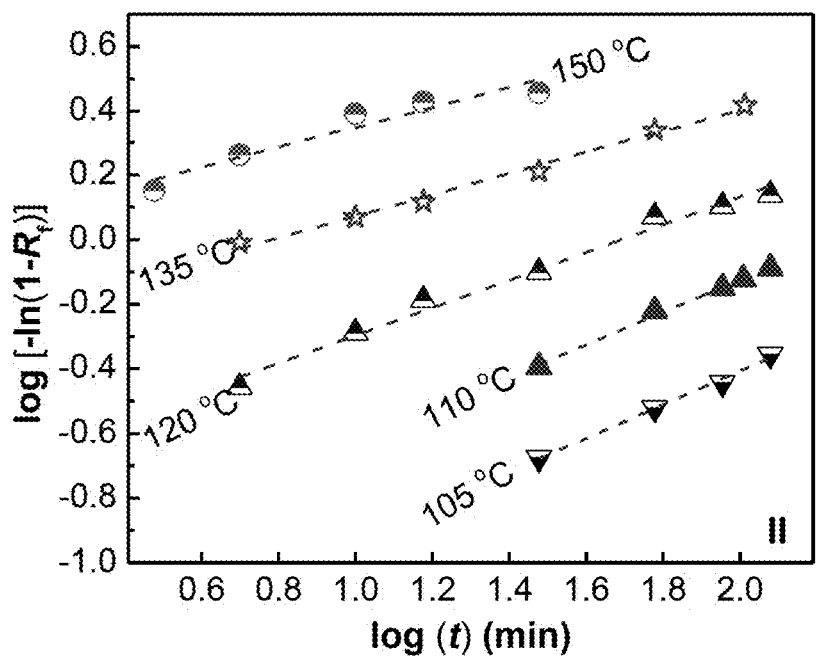
FIG. 14C is a plot of log $[-\ln(1-R_f)]$ vs. log(t) of PU foam for foam II. The dash lines are the KWW stretched exponential fits.
Figure 14D:
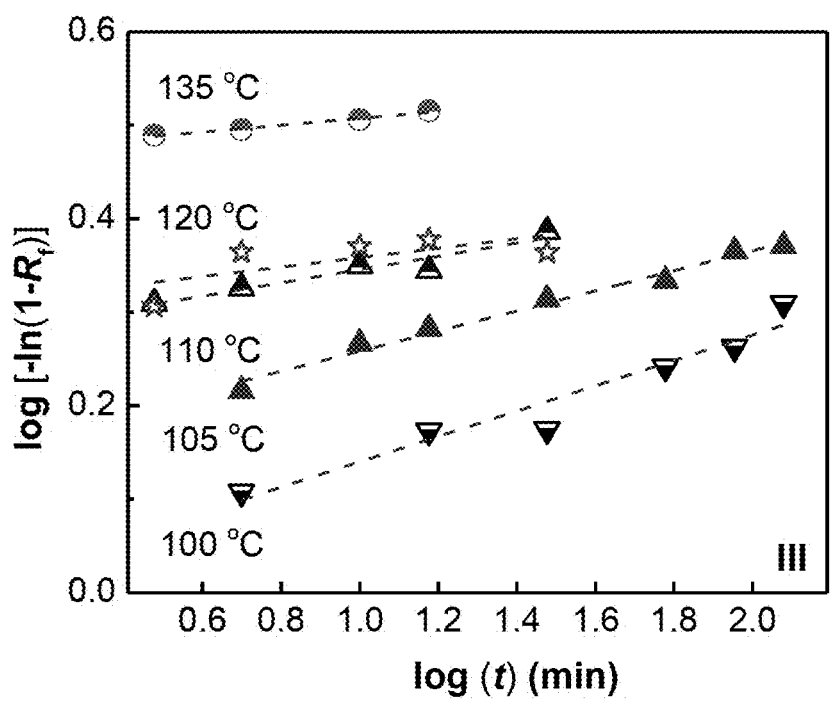
FIG. 14D is a plot of log $[-\ln(1-R_f)]$ vs. log(t) of PU foam for foam III. The dash lines are the KWW stretched exponential fits.

It is thus essential to further elucidate the effect of SAN relaxation process on the structural convertibility of SAN containing foams 205. For this purpose, systematic experimental measurements were performed with II and III at different temperatures. The preloading strain used for each of the foams 205 was taken as 40% in which the adhesion effect on the structural convertibility can be neglected. As shown in FIGS. 14A and 14B, a longer heating time gives a higher structural convertibility and an increased temperature also favors a higher structural convertibility. The accompanying FIGS. 14C and 14D are replotting the same results in FIGS. 14A and 14B as log $[-\ln(1-R_f)]$ vs. log(t) in double-logarithmic plots respectively, based on the emprcal Kohlrausch, Williams and Watts (KWW) stretched exponential function. [53,54]. Equation 6 presents a function used to describe the structural relaxation in amorphous systems:

$$1 - R_f = \exp\left[-\left(\frac{t}{\tau(T)}\right)^\beta\right] \quad \text{Eqn. 6}$$

Figure 14E:
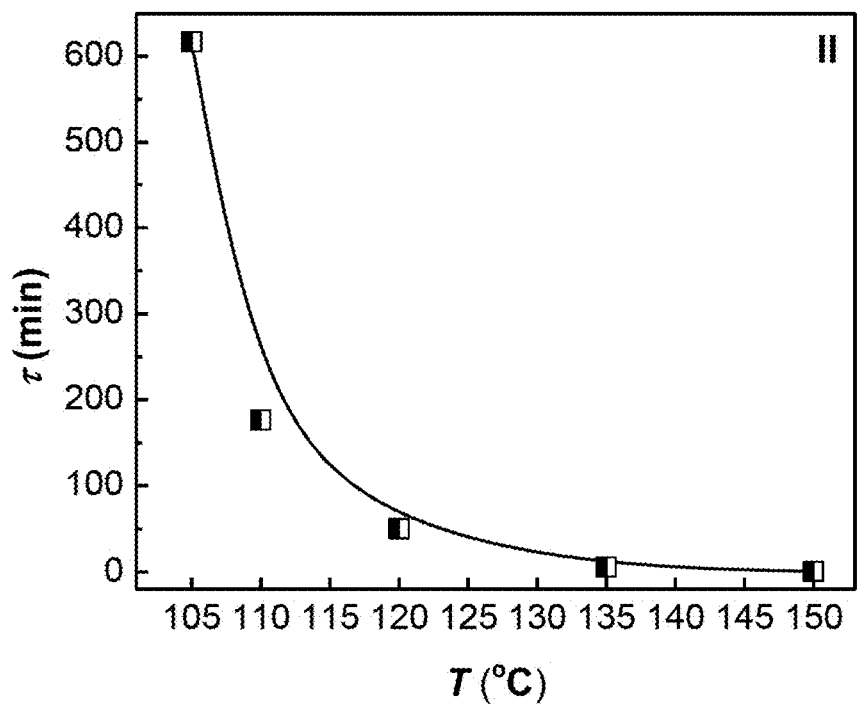
FIG. 14E is a plot of relaxation time as a function of temperature for PU foam II.
Figure 14F:
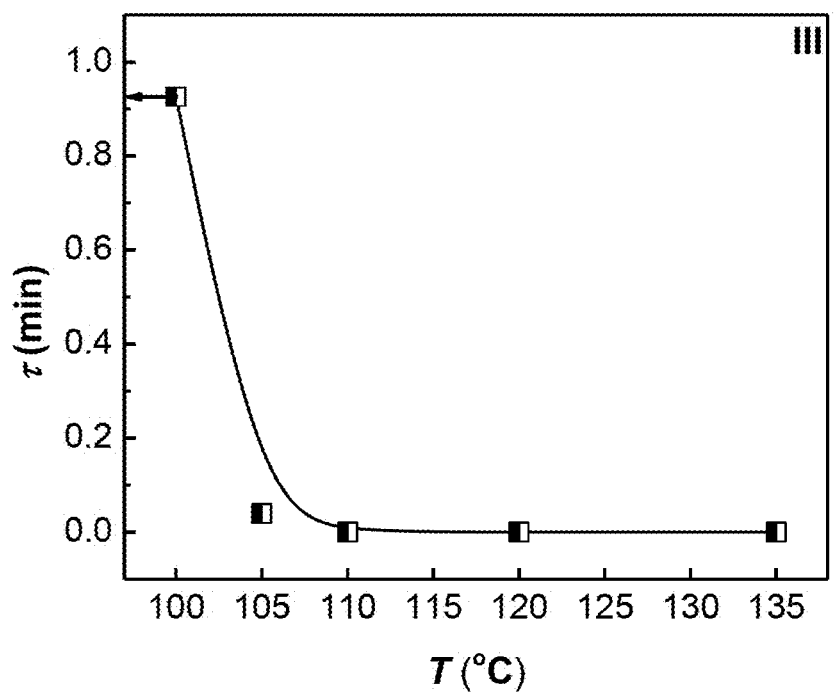
FIG. 14F is a plot of relaxation time as a function of temperature for PU foam III.

In Equation 6, $\beta(0<\beta\leq1)$ is the stretch exponent, $\tau$ is the relaxation time and T is the temperature. As can be seen in FIGS. 14C and 14D, experimental measurements exhibited good agreement with the KWW stretched exponential fits. The values of r calculated by fitting the data in a double-logarithmic plot (FIGS. 14C and 14D) are presented in FIGS. 14E and 14F, respectively. For the relaxation time, a critical "slowing down" was observed close to the glass transition of SAN as would be expected. However an important question raised herein is why the relaxation time of SAN in II and III is so different. It is speculated that this difference can be attributed to the different stress constraints on SAN fillers, originated from the elastic matrix. If the filler polymer sizes and grafting are roughly equal, the stress constraints mainly depend on the content of filler polymers. For low content of filler polymers, an increase stress constrains can be anticipated, resulting in a longer relaxation time.

The approach undertaken in this section attempts to interpret the underlying mechanism of structural conversion in flexible PU foams 205. It is speculated that the structural converbility of these foams 205 can be rationalized in terms of three factors: SAN particles, hydrogen bonding between hard- and soft-domains, and adhesion between the cell ribs generically resulted from van der Waals interactions. Due to the significant role of SAN filler polymer's relaxation process in the structural conversion, the stretched exponential function was employed as a simple way to analyze the structural conversion experiments in the SAN containing flexible PU foams (II and III). The findings above provide valuable insights into the important relationship between processing temperature and heating time for the optimal design of auxetic manufacture of flexible PU foams 205.

Autexic Foams Manufacture

Figure 15:
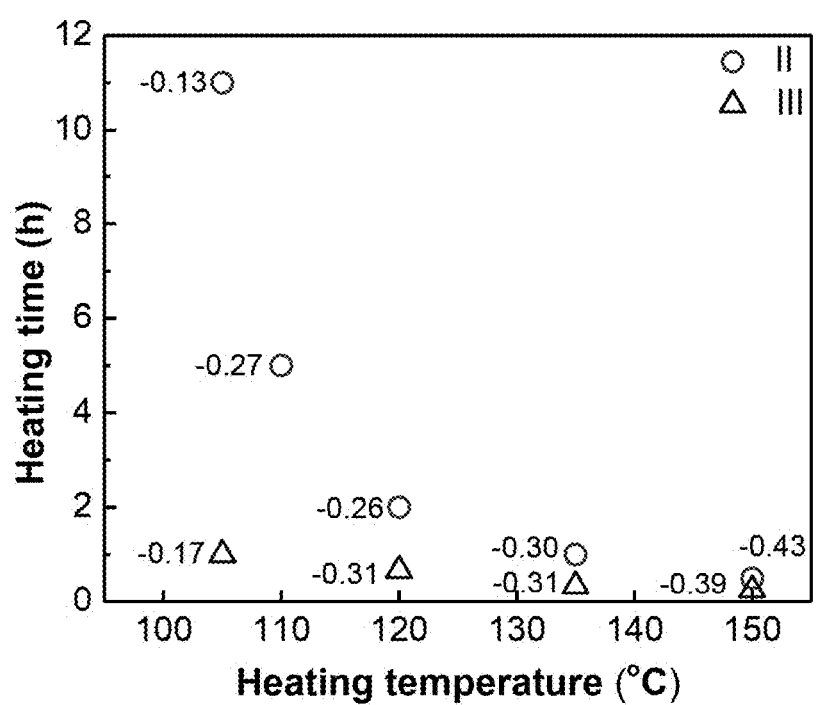
FIG. 15 is a graph showing heating time as a function of process temperature in the auxetic manufacture of foams II and III. Inset numbers are measured mean Poisson's ratio of auxetic foams.
Figure 16A:
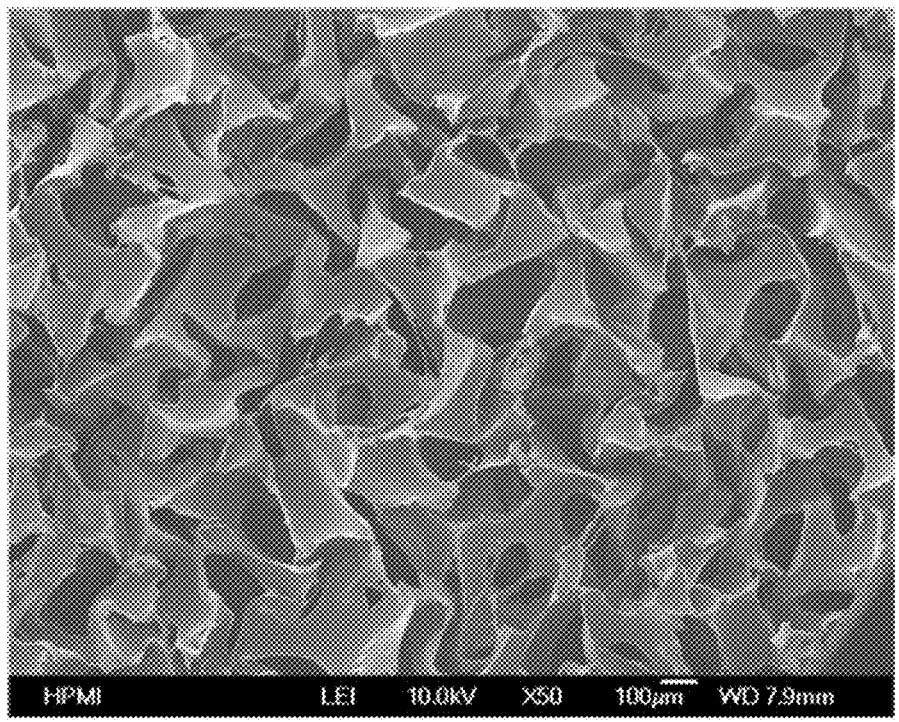
FIG. 16A is a SEM image of the auxetic foam prepared from foam II at 150° C. for 20 min (volume compression ratio 0.7).
Figure 16B:
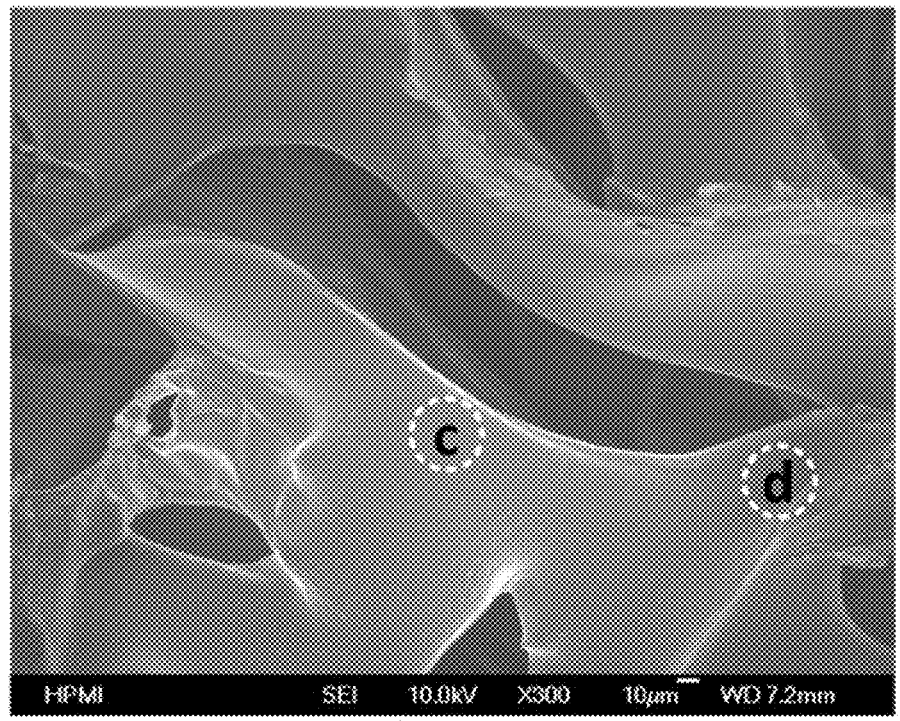
FIG. 16B is a SEM image of the auxetic foam prepared from foam III at 150° C. for 20 min (volume compression ratio 0.7).
Figure 16C:
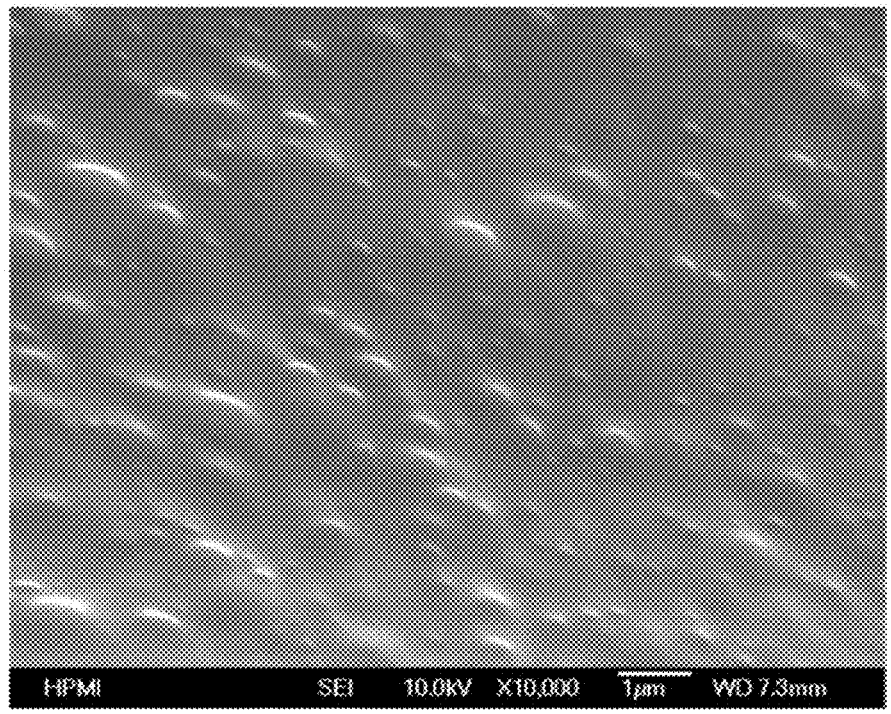
FIG. 16C illustrates that SAN particles are stretched along the local stress direction.
Figure 16D:
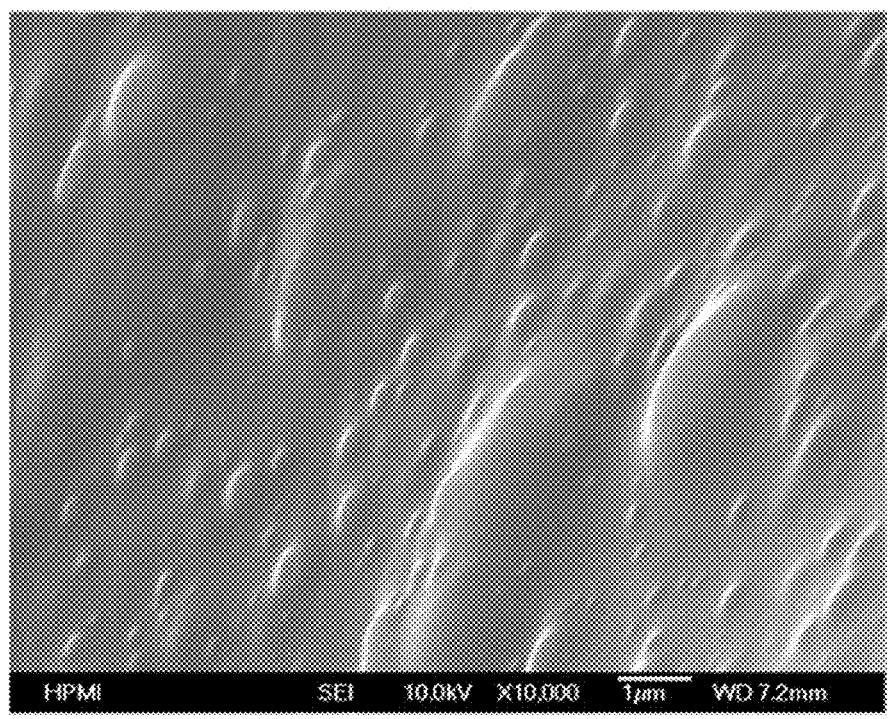
FIG. 16D illustrates that SAN particles are stretched along the local stress direction.

In an attempt to compare the above findings to the practical auxetic manufacture process, auxetic samples 205 were prepared. It was found that sample I cannot be converted to auxetic foam due to its extreme poor structural convertibility from hard-soft domains hydrogen bonding. Thus, the following discussion will only focus on II and III. FIG. 15 shows heating time as a function of processing temperature in the auxetic manufacture of foams II and III. The results show that the auxetic manufacture processing condition is clearly related to the SAN loading. This observation suggests that simply by increasing the SAN loading, the structural convertibility, with regard to the auxetic manufacturing, can be easily satisfied at least from the view point of process. For given foams 205, the relationship between heating time and process temperature is almost consistent with the relaxation time data. This reflects the critical role of SAN relaxation process in auxetic manufacture.

Moreover, considerable evidence from SEM supports this finding. FIGS. 16A through 16D show the SEM images for the auxetic foam 205 with a Poisson's ratio −0.69 (fabricated from III at 150° C. for 30 min). The typical re-entrant structure is clearly illustrated in FIG. 16A. Also the stretching SAN particles along the local stress direction are confirmed by the finer SEM images shown in FIGS. 16C and 16D. Thus it is plausible that the SAN particles serve as curing agents which could "freeze" the re-entrant structure formed when the foam 205 is cooled to below its glass transition temperature.

Figure 17A:
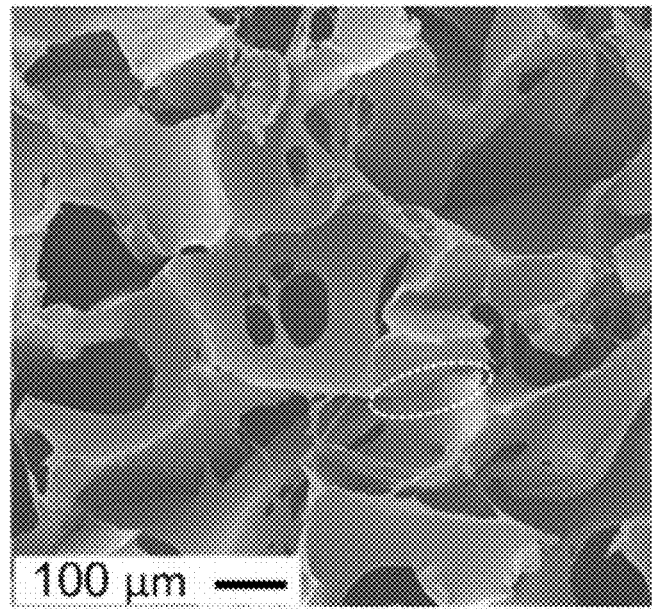
FIG. 17A presents a SEM image of the sample prepared from foam III at 150° C. for 60 min (volume compression ratio 0.85).
Figure 17B:
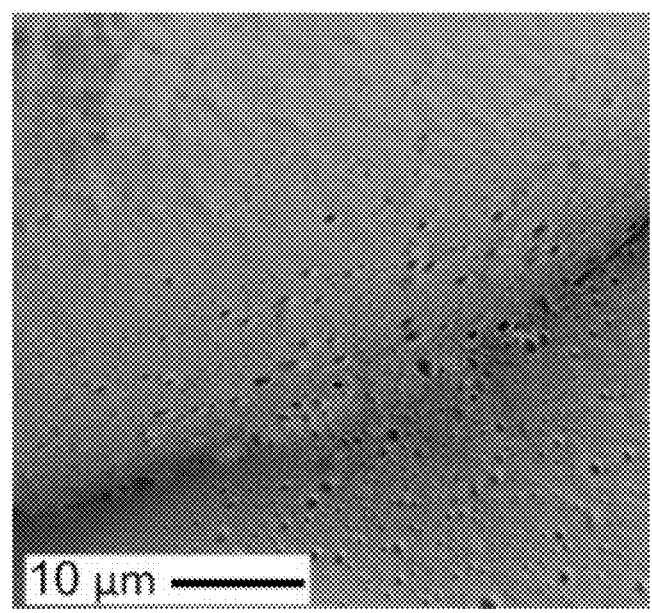
FIG. 17B presents a SEM image of the sample prepared from foam III at 150° C. for 60 min (volume compression ratio 0.85).

It is interesting to note that no matter what role the adhesion plays in the structural convertibility of flexible PU foams 205, it should be avoided in the fabrication of auxetic foams 205. This is due to the adhesion between the cell ribs causing a significantly retard nonaffine kinematic. FIG. 17 shows a typical SEM image of the sample 205 fabricated from III at 150° C. for 60 min (volume compression ratio 0.85). Although this sample still presents a similar re-entrant structure, the finer images show that some of the contact interface is combined, resulting in a positive Poisson's ratio (v=0.13).

Figure 18:
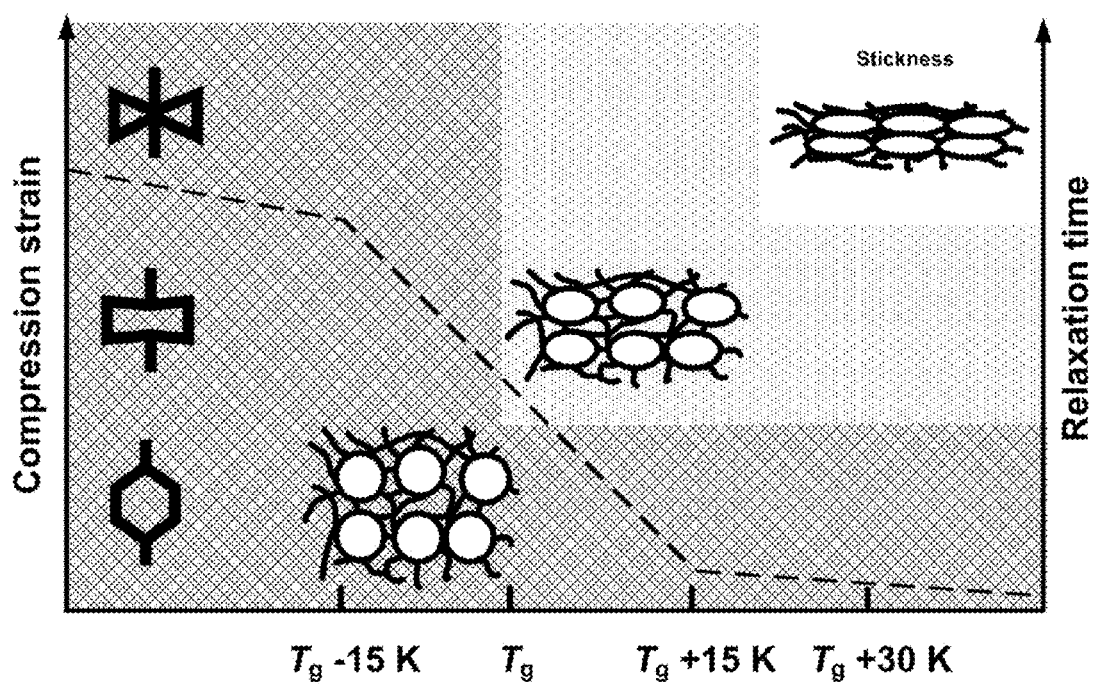
FIG. 18 is a schematic diagram of the process window for the fabrication of auxetic flexible PU foam.

Based on the results herein, FIG. 18 illustrates a schematic diagram to explain the process window for the fabrication of auxetic flexible PU foam 205. During the conversion process, the temperature normally should be higher than the glass transition temperature of SAN filler polymers for a reasonable process time. Medium compression strain is also needed to force the cell ribs to buckle. It was also argued that the combination of high temperature and high compression strain is extremely harmful for auxetic manufacturing due to the unavoidable adhesion between the cell ribs.

As presented herein, several critical questions concerning auxetic manufacturing of flexible PU foams 205 are answered, based on a relative complete understanding of the microstructure for the conventional flexible PU foams 205 studied herein by the combination of different techniques. The significant role of SAN filler polymers in the structural conversion of the flexible PU foams 205 has been demonstrated for the first time. This interesting finding indicates that SAN containing flexible PU foams 205 are excellent choices for use in the fabrication of auxetic PU foams 205. Measurements of $T_g$ are acceptable probes of identification of the softening temperature mentioned in the general instruction for auxetic manufacture of flexible PU foams 205. The stretched exponential function is a simple but useful tool to identify the optimum processing temperature and heating time in the fabrication process of auxetic PU foams 205.

Fabrication of Auxetic PU Foams

PU foams 205 used for auxetic manufacture may comprise two domains: soft domain with dissolved hard domain and styrene acrylonitrile copolymer (SAN) filler polymers. The soft domain provides PU foams 205 sufficient deformational ability required for structural conversion, while the hard domain acts as "curing agents" to fix the deformed structure of PU foams 205 via the remarkable mobility change of macromolecular chains around the glass transition temperature ($T_g$). This finding can help elucidate some of the problems reported in the typical "compression-heating-cooling" procedure for production of auxetic PU foams 205, and also provide an answer to why acetone plays a role similar to an increase in temperature in chemical-mechanical approach. This effect may be due to the strong interactions between SAN and polar solvents (e.g., acetone, dimethylformamide and chloroform) resulting in a large depression of glass transition temperature of SAN filler polymers ($T_{g,SAN}$).

Carbon dioxide ($CO_2$) is of growing interest as a solvent in industrial practice and academic research due to its attractive properties, such as being inexpensive, nonflammable, environmentally friendly and easily removed from foam 205 products, as well as the tunability of physicochemical and mechanical properties (such as density and mobility) by varying pressure and temperature. [59-65] It has been reported that substantial reduction in $T_g$ can be expected for polar polymers (e.g., poly(methyl methacrylate), poly(L-lactide) and acrylonitrile butadiene styrene copolymer) in the presence of dissolved $CO_2$, [66-69] due to enhanced specific interactions of $CO_2$ with carbonyl or nitrile groups. [70] Along the same line as Grima et al.'s method, [55] it is, therefore, appropriate to consider $CO_2$ as a solvent to reduce the glass transition temperature of SAN and further service to assist the fabrication of auxetic PU foams 205.

Figure 19:
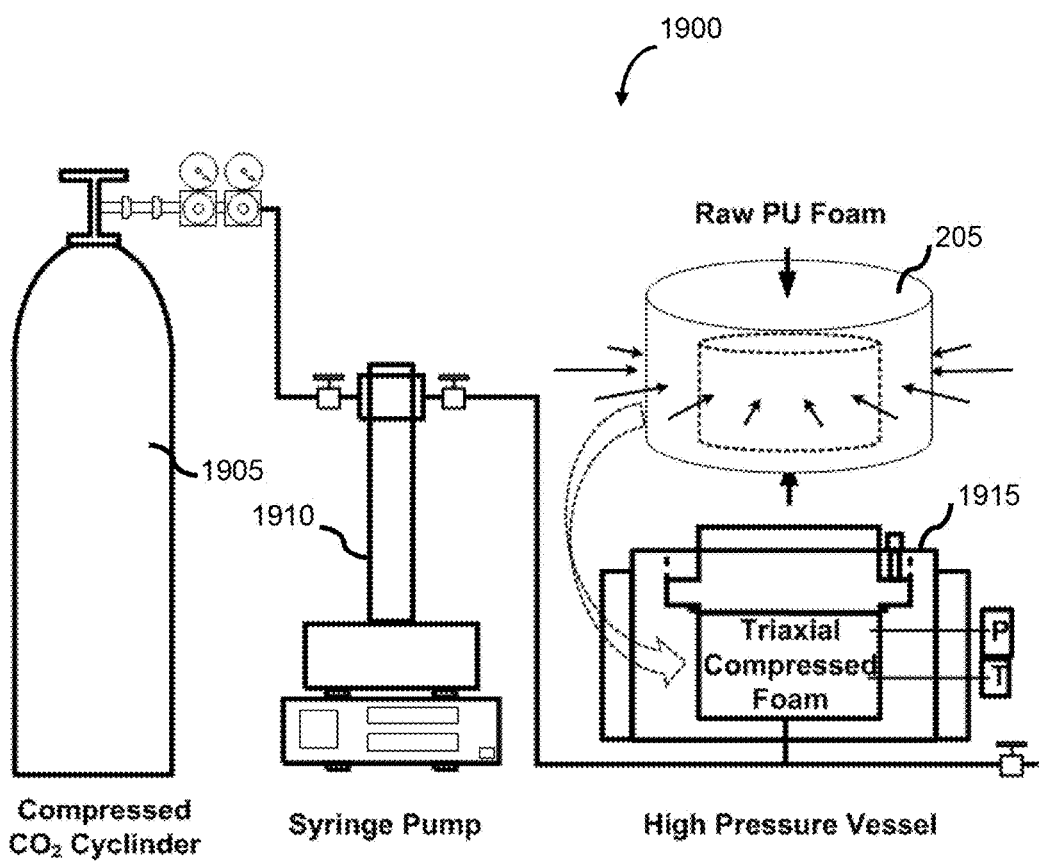
FIG. 19 is a schematic diagram of sample preparation equipment for the fabrication of auxetic PU foams with compressed $CO_2$.

FIG. 19 illustrates a schematic diagram of an experimental setup 1900 and sample preparation technique. The experimental setup 1900 may comprise a cylinder 1905 of compressed $CO_2$ supplying compressed $CO_2$ gas to a syringe pump 1910. $CO_2$ from the syringe pump may be used to pressure a pressure vessel 1915. Auxetic foam samples 205 were prepared by inserting a raw PU foam specimen 205 into the pressure vessel 1915. The vessel size ($V_h$) was smaller than the initial volume value ($V_0$) of raw PU foam specimen 205. The volumetric change (VC) of PU foams 205 is defined by $VC=(V_0-V_h)/V_0$. The vessel 1915 was then filled with compressed $CO_2$ at selected temperature (T) and pressure (P). After equilibrium was established, the pressure inside the vessel 1915 was released and the foam sample 205 was removed.

Figure 20A:
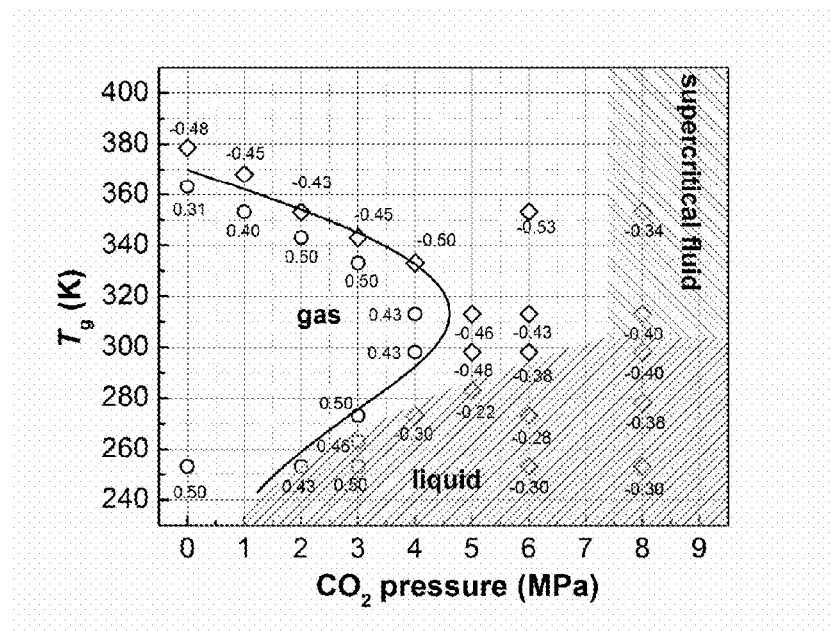
FIG. 20A illustrates a temperature and pressure processing window for auxetic manufacture of PU foams with compressed $CO_2$. The circle and diamond show unsuccessful and successful processing conditions, respectively (the inset values are measured Poisson's ratio). The line in the graph is the glass transition temperature ($T_g$) of SAN (AN content, 30 wt %)—$CO_2$ system.
Figure 20B:
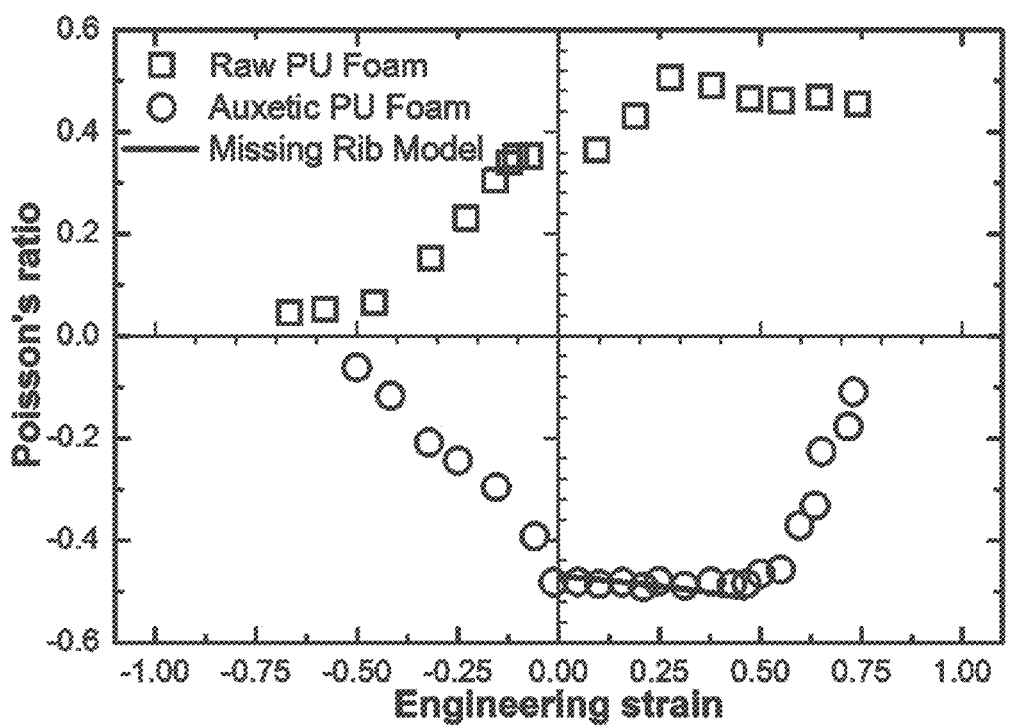
FIG. 20B is a graph of Poisson's ratio values as a function of axial engineering strain for PU foam and auxetic PU foam fabricated at 25° C. and 5 MPa with a predefined volumetric change 0.75. The inset in FIG. 20B shows the missing-rib unite cell.

FIG. 20A shows the processing window for auxetic manufacture of PU foams 205 with compressed $CO_2$. For these studies, the initial volumetric change of PU foam specimen 205 was fixed at 0.75 (that is, the foam sample 205 was reduced to 25 percent of its initial volume $V_0$), and a minimum processing time of 4 h was used to establish thermal equilibrium. In various embodiments, the initial volumetric change may be less than 0.75. The circles and diamonds in FIG. 20A represent unsuccessful and successful processing conditions, respectively. Inset numbers are measured mean Poisson's ratio in a tensile test with a strain rate of 6 mm/min and maximum strain of 30%. The results clearly show that processing temperature can be dramatically reduced by the introduction of compressed $CO_2$. Note that under rather moderate pressure (about 5 MPa), auxetic foam can be successfully fabricated even at room temperature. FIG. 20B shows representative plots of Poisson's ratio as a function of engineering strain for raw PU foams 205 and auxetic PU foams 205 (fabricated at 25° C. and 5 MPa with a predefined volumetric change 0.75). The results show that the Poisson's ratio of raw PU foams 205 has a value of +0.38 for small strain and approach +0.5 for large tension strain and 0 for large compression strain. Auxetic foams 205, however, exhibit Poisson's ratio of approximate −0.5 for a wide range of axial strains (0 to 0.5), agreeing well with the missing-rib model proposed by Smith et al. (line in FIG. 20B) [71,72] This finding is very different from previous reports that auxetic PU foams 205 generally show strain-dependent Poisson's ratio. [19,22,27]

The glass transition temperature of the SAN-$CO_2$ system was calculated by using Sanchez-Lacomb equation of state (SL-EoS) [73,74] and applying the Gibbs-DiMarzio thermodynamic criterion for glass transition, following the thermodynamic framework developed by Condo et al. [75] (the line in FIG. 20A). The processing windows for auxetic manufacture of PU foams 205 with compressed $CO_2$ is well described by the glass-transition temperature profile of the SAN-$CO_2$ system except for some cases at sub-zero temperature and low pressure.

Figure 20C:
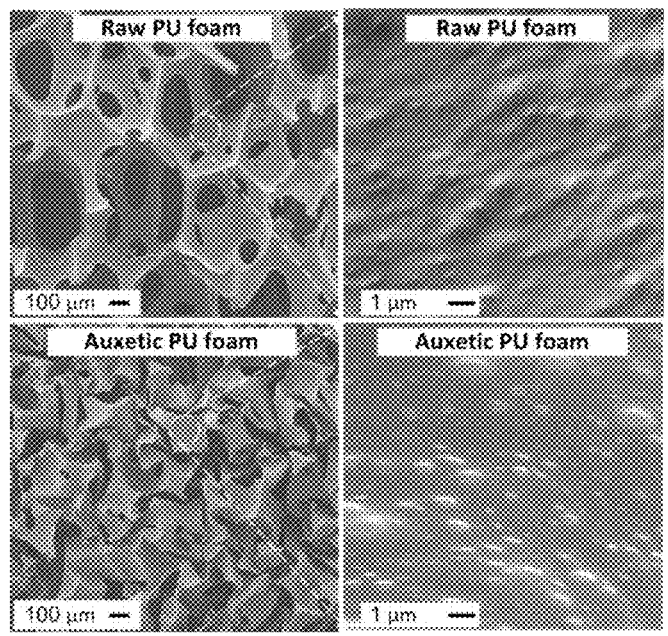
FIG. 20C presents scanning electron micrographs demonstrating the morphology of raw PU foam and auxetic PU foam fabricated at 25° C. and 5 MPa with a predefined volumetric change 0.75.
Figure 20D:
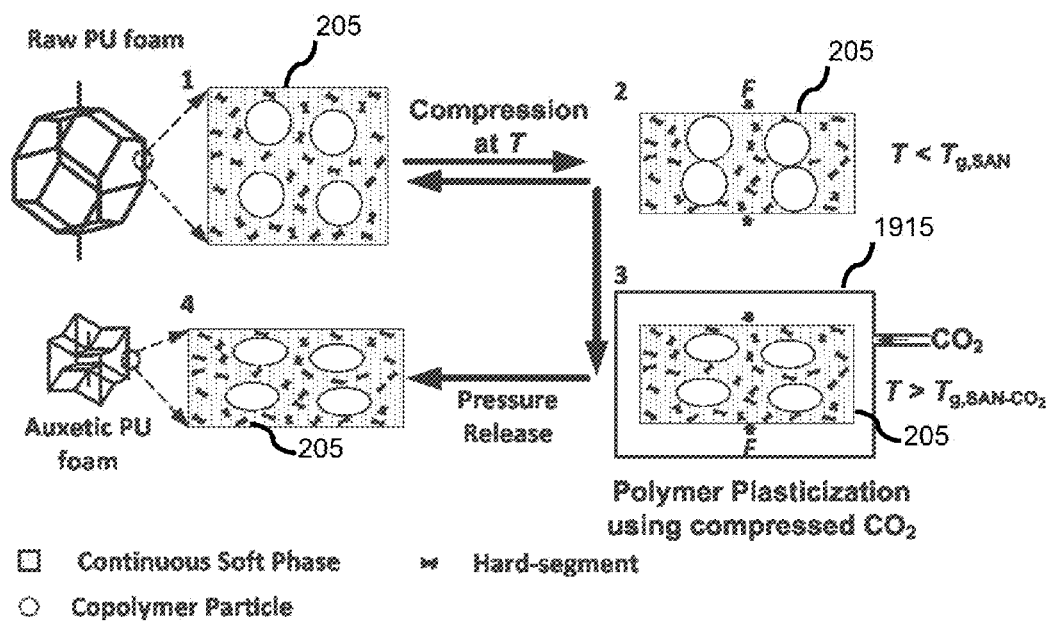
FIG. 20D is a schematic of a mechanism for structural change in PU foams during auxetic conversion.

FIG. 20C shows representative scanning electron microscopy (SEM) images of raw PU foam 205 and auxetic PU foam 205 (fabricated at 25° C. and 5 MPa with a predefined volumetric change 0.75). Compared to the typical open-cell structure in raw PU foam 205, auxetic specimen shows a generally inwardly-buckled structure. [1] Also, a clear shape change in SAN fillers was detected in SEM images taken at high magnification. It is proposed that when PU foams 205 are exposed to $CO_2$ under given processing conditions (P and T), $CO_2$ can dissolve in SAN filler polymers, causing a large decrease in glass transition temperature of SAN ($T_{g, SAN-CO2}$<T). Thus SAN can undergo a glass transition from glassy state to rubbery state. In response to external force equilibrium these fillers can relax quickly to be deformed from their general spherical shapes, into generally ellipsoidal shapes. After pressure release, these fillers can quickly vitrify again (transition from the rubbery state to the glassy state) due to the removal of $CO_2$ and the ellipsoidal shape is fixed. A schematic describing the auxetic conversion of PU foams 205 using compressed $CO_2$ is depicted in FIG. 20D.

Figure 21A:
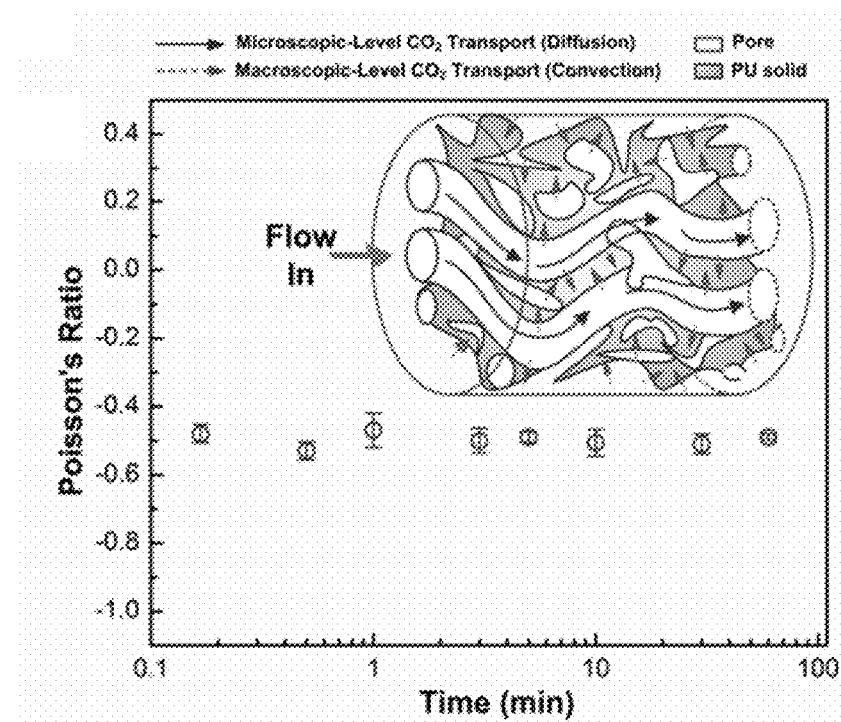
FIG. 21A is a graph of the effect of processing time of auxetic PU foams during auxetic manufacture with compressed $CO_2$. Auxetic samples were fabricated at room temperature (25° C.) and very modest pressure (5 MPa) with a predefined volumetric change 0.75. The inset in FIG. 21A shows a schematic diagram of $CO_2$ transport in a representative elementary volume of PU foam.

Next, the effect of processing time on Poisson's ratio was examined. Foam samples 205 with a predefined volumetric change (VC=0.75) were fabricated using $CO_2$ at 25° C. and 5 MPa for different times. As shown in FIG. 21A, little effect of processing time on Poisson's ratio values is found in a wide range of time scale. Manufacturing of auxetic foam can be completed within seconds. This can be simply explained by considering two factors: one is the rapid convection of $CO_2$ in pores of PU foams 205, and the other is the extremely short diffusion distance (~100 μm) for $CO_2$ gas (FIG. 21A, inset).

Figure 21B:
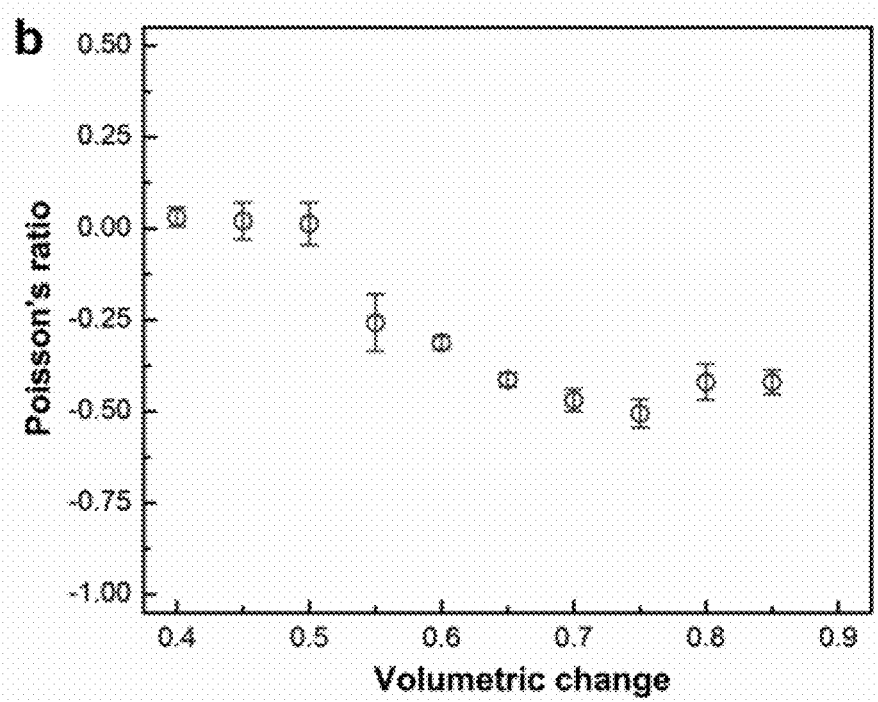
FIG. 21B is a graph of the effect of volumetric change on Poisson's ratio of auxetic PU foams during auxetic manufacture with compressed $CO_2$. Auxetic samples were fabricated at room temperature (25° C.) and very modest pressure (5 MPa) with a predefined volumetric change 0.75.

Initial volumetric change is another important factor that determines Poisson's ratio of the resulting samples 205. To study its effect, samples 205 with different VC were fabricated using $CO_2$ at 25° C. and 5 MPa for 10 minutes. As shown in FIG. 21B, applying small volumetric change (VC≤0.5) would produce samples 205 with almost positive Poisson's ratio values. With the increase in initial volumetric change (0.5<VC≤0.75), Poisson's ratio values decreased approximately linearly from 0 to −0.5. But a further increase in VC (>0.75) led to a slight increase in Poisson's ratio. This result, in agreement with the previous studies, suggests a volumetric change of 0.5-0.85.

These results demonstrate that auxetic PU foams 205 can be fabricated at room temperature by judicious choice of the pressure of $CO_2$ and displayed a unique feature: the Poisson's ratio of auxetic foams 205 is almost independent of the applied tensile strain up to 50%. This fabrication is efficient, economic and environmentally benign, implying the potential for large-scale industrial application.

In various embodiments, the pressure vessel 1915 (see FIG. 19) may comprise a mold for a particular shape. As the foam 205 is compressed, the foam 205 conforms to the shape of the mold. Once the filler polymer transitions from the rubbery state back to the glassy state, the foam 205 may retain the shape of the mold after removal from the pressure vessel 1915.

Optimization and Scale Up of Auxetic Foam Manufacturing Process

Approach 1

An existing process, which produced one auxetic foam 205 sheet at a time, used a single fabrication unit in a main heated chamber to produce the auxetic foam sheet. The productivity may be increased by using multiple conversion units so that multiple foam 205 sheets may be produced in one batch operation cycle. Processing time must be optimized. When the number of fabrication units used is increased from single to multiple units, the temperature and the distribution within the main chamber will change, which will affect the materials relaxation process. This in turn will dictate the required time for the auxetic conversion, which is the most crucial process that decides the final quality of the auxetic foams 205. Temperatures within the multiple conversion units will be carefully measured, and the respective relaxation times for the foams 205 in these units will be calculated by using Kohlrausch, Williams and Watts (KWW) stretched exponential function and modeling fitting [80,81]. The longest relaxation time will be used for the processing time for multiple sheets conversion process.

Approach 2

Since the substantial solubility of $CO_2$ is in the materials used, the polymer mobility is significantly enhanced and relaxation may take place more rapidly at much lower temperatures [82], providing several advantages over the aforementioned thermal process (Approach 1). Lower processing temperature may result in lower energy consumption and reduced cost. Since PU foams 205 are thermal insulators, heating takes a long time during which much of the energy is wasted. Moreover, achieving uniform temperature in large piece or block of PU foam 205 would be extremely difficult. This affects the quality and limits the size of the auxetic foams 205 that can be fabricated. Using multiple conversion units with smaller thickness may only partially address the foam 205 quality issue and may impose constraints on achievable sheet form factors for sock fabrication. Studies using lab-scale equipment have shown that auxetic foams 205 may be produced at near room temperature, which would greatly reduce or even eliminate the energy for heating. Results have suggested that the overall cycle time can be reduced to several minutes or even within seconds, instead of hours required for the thermal conversion process discussed earlier. Thus this technology would enable manufacturing of auxetic foams 205 of much larger sizes at a fraction of the current costs and time.

Figure 22:
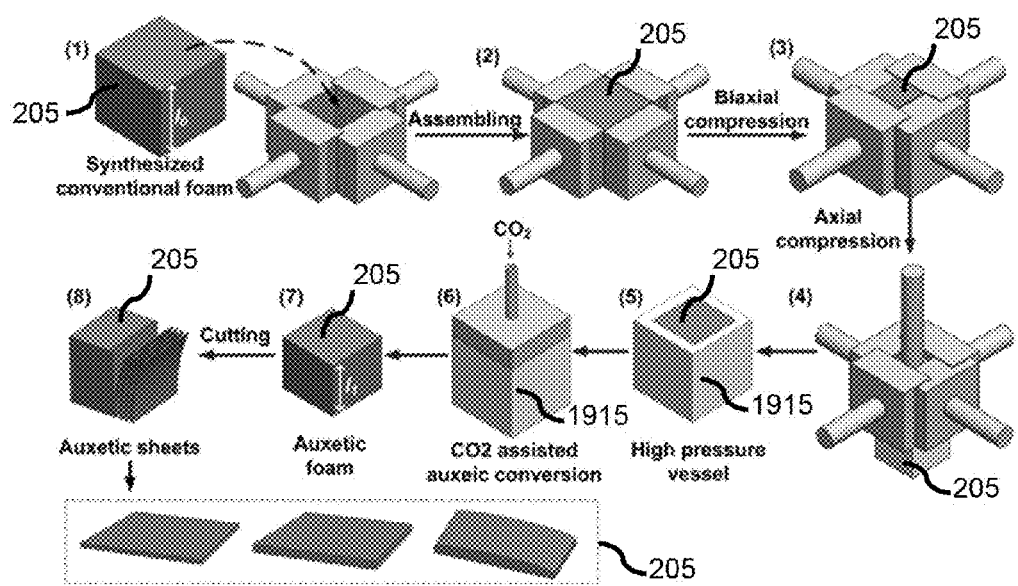
FIG. 22 is a schematic diagram of a method for producing auxetic foam.

FIG. 22 is a schematic illustration of the process according to various embodiments. Tooling may be designed and machined to hold the regular PU foams 205 (work piece). The foam 205 work piece may be first compressed biaxially in the in-plane directions, after which the foam 205 may be pushed down from the out-of-plane direction into the pressure vessel 1915 while simultaneously compressed in the third dimension. The vessel 1915 may be sealed and carbon dioxide injected. The vessel 1915 may be held at certain pressure and may be heated if necessary. Auxetic conversion may proceed. Thereafter the $CO_2$ pressure will be released and the auxetic foam 205 removed from the vessel 1915.

Application of Auxetic Foams in Prosthetics

Figure 23A:
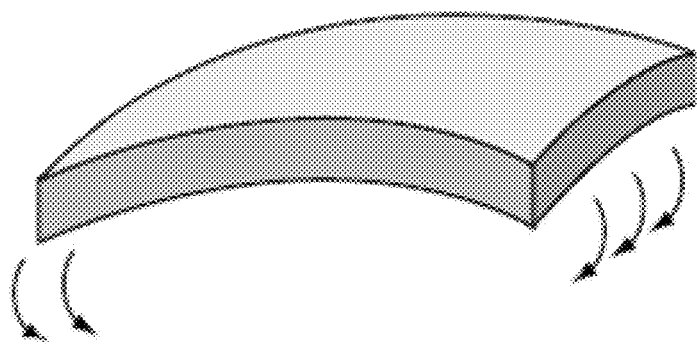
FIG. 23A illustrates the shape of auxetic foam in sheet form when bent.
Figure 23B:
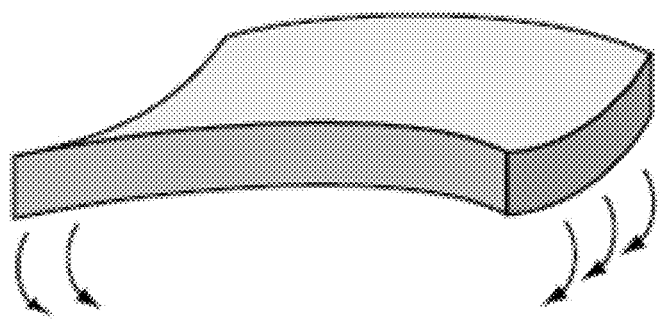
FIG. 23B illustrates the shape of non-auxetic foam in sheet form when bent.

Auxetic materials also possess a unique property that would hugely benefit below-knee (BK) patient. When bent, the foam materials 205 form doubly curved or domed shapes due to their synclastic curvature properties, as shown in FIG. 23A. Socks made of these materials would allow for the natural conformity to the limb, especially to the knee region throughout flexion/extension, which is crucial so as not to impede the natural range of motion of the limb. Conventional materials form saddle-like shapes in the direction perpendicular to knee motion as shown in FIG. 23B, restraining the knee motion and causing discomfort, and may cause crimping of the materials in the lateral direction.

SSMART Sock Manufacturing

Figure 24:
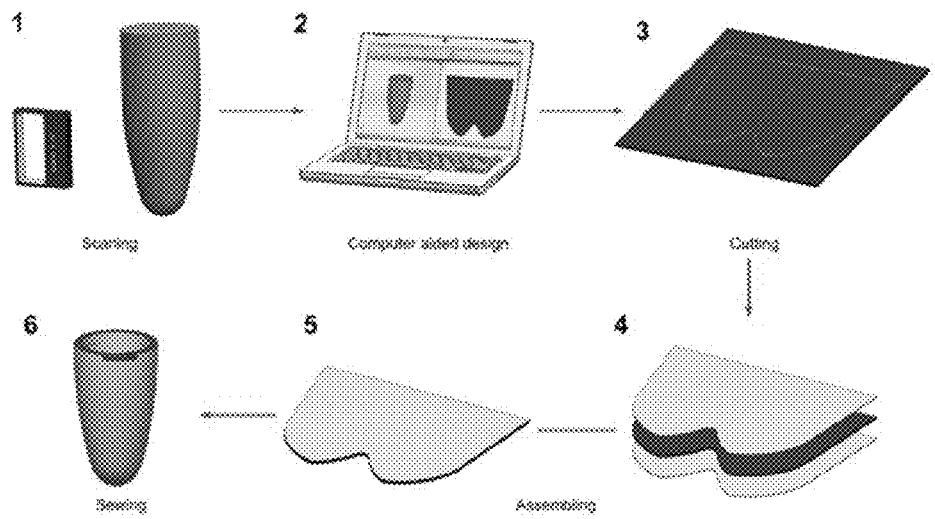
FIG. 24 is a schematic diagram of a method for producing a prosthetic sock comprised of auxetic foam.

Various embodiments may comprise may comprise a prosthetic sock manufactured from auxetic foam 205 as described above. Referred to as the SSMART (smart sock manufactured for amputee rehabilitation and comfort) prosthetic sock, the sock may be directly fabricated from the auxetic foam 205 sheets. This approach has the advantage of lowered cost and easy implementation. FIG. 24 illustrates a process for manufacturing such socks according to various embodiments. Using a residual limb model (similar to that used for liner fabrication obtained by current standard practice), the 3D geometry may be captured by a scanner and transferred and converted to a format readable by CAD software such as SolidWorks®. A virtual "unzip" process may then be performed to unfold the 3D model that replicates the external surface of the residual limb into a 2D pattern. Patterns of this size may be cut out from the auxetic foam 205 sheets for sock fabrication. To provide additional structural integrity and reinforcement, two layers of ply cloth, commonly used in some liner fabrication, may be used as backing layers on both sides of the foam 205. The assembly may be rolled into the conical shape that accurately represents the initial limb geometry, followed by sewing and stitching to complete the sock fabrication. If needed, the seam may be strengthened by applying a small amount of adhesive.

Figure 25:
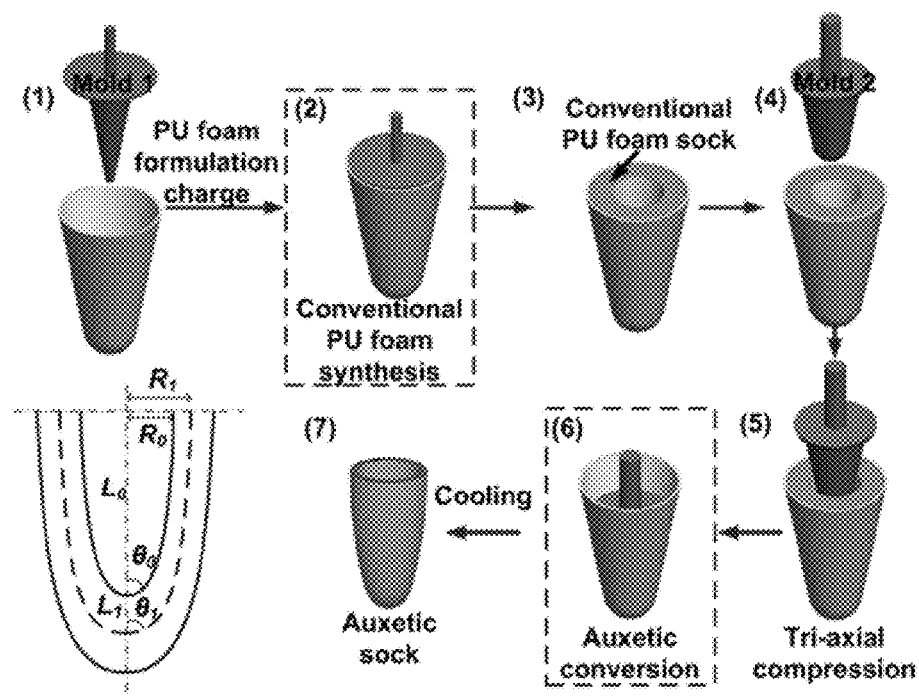
FIG. 25 is a schematic diagram of a method for producing a prosthetic sock comprised of auxetic foam.

Net-shape manufacturing of SSMART sock may also be used. Having SSMART sock fabricated directly into the final desired shape would eliminate seams and improve the structure integrity and durability of the sock. FIG. 25 illustrates an exemplary method according to various embodiments. The first step may be the synthesis of the regular PU foam 205 sock in a closed mold set (mold 1). A metered amount of PU foam 205 formulation may be charged into the mold. Ensuing reactive foaming may produce the intermediate conventional PU foam 205 sock. Following this the mold may be opened and a second male mode (mold 2) may be used to exert the isotropic tri-axial compression, $CO_2$ may be injected into the mold during the auxetic conversion step to lower the processing temperature and reduce the conversion time, similar to what's discussed in Approach 2 and FIG. 20 above. By changing the geometric parameters of the two sets of molds, such as the length, the radius, tapered angle and of the radius of the male mold lid, SSMART socks with designed size, shape and thickness (and/or thickness gradient) may be fabricated.

Summary of Methods for Producing Auxetic Foam

Figure 26:
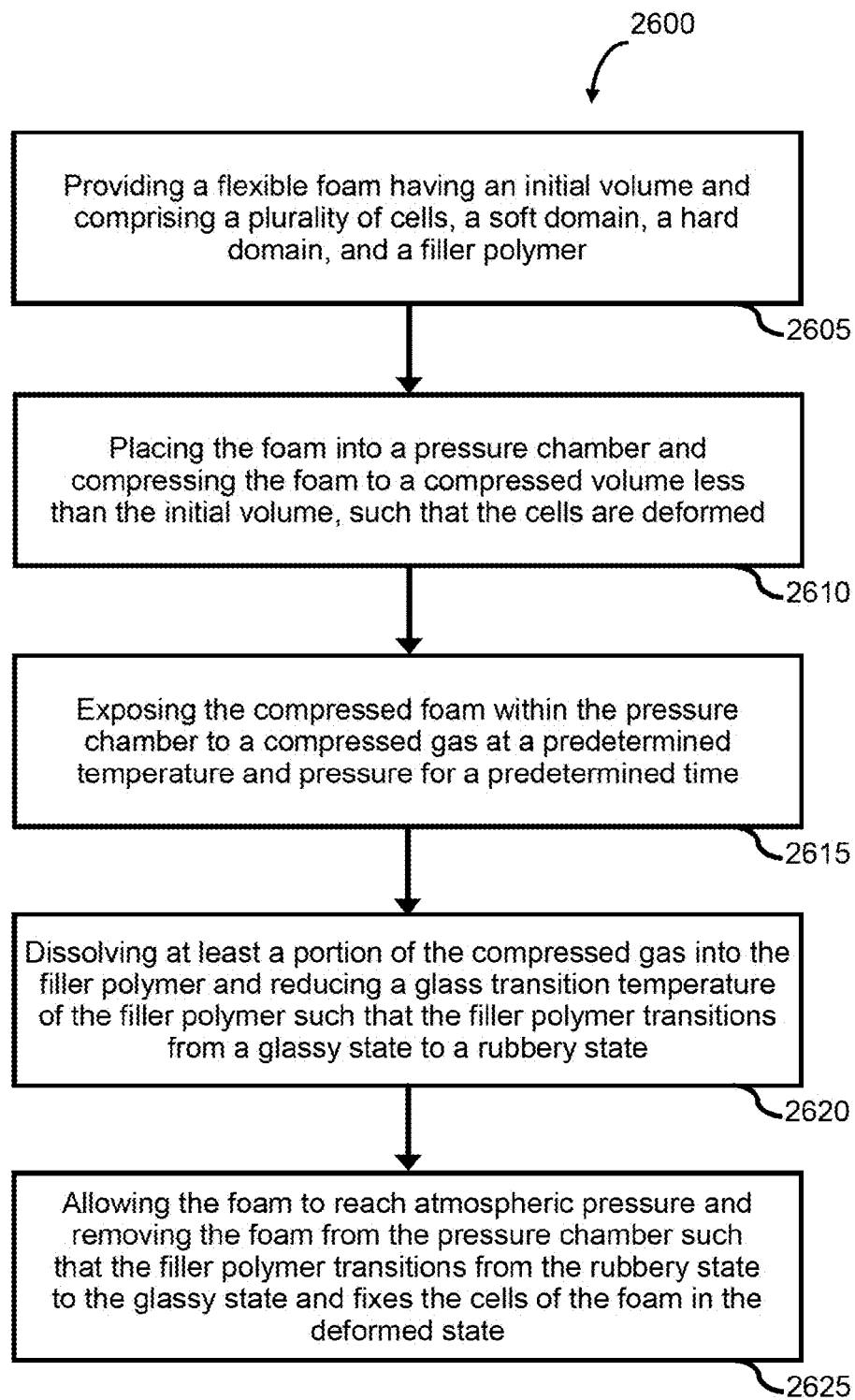
FIG. 26 is a flow chart of an exemplary method for producing an auxetic foam.

FIG. 26 illustrates a general flow diagram of various embodiments of a method 2600 for producing an auxetic foam 205. At step 2605, a flexible foam 205 may be provided. The foam 205 may have an initial volume and may comprise a plurality of cells. A bulk matrix polymer of the foam may comprise a soft domain, and a hard domain. The bulk matrix polymer may comprise a filler polymer. The foam 205 may be placed into a pressure chamber 1915 at step 2610. The foam 205 may be compressed to a compressed volume that is less than the initial volume. The cells of the foam 205 may be deformed when the foam 205 is compressed. At step 2615, the compressed foam 205 may be exposed to a compressed gas within the pressure chamber 1915. The pressure chamber 1915 may be maintained at a predetermined temperature and pressure for a predetermined time. At least a portion of the compressed gas may dissolve into the filler at step 2620. The dissolved gas may reduce a glass transition temperature of the filler polymer such that the filler polymer transitions from a glassy state to a rubbery state. At step 2625, the pressure may be relieved and allowed to reach atmospheric pressure before removing the foam 205 from the chamber 1915, such that the filler polymer transitions from the rubbery state to the glassy state, thereby fixing the cells of the foam 205 in the deformed state.

Figure 27:
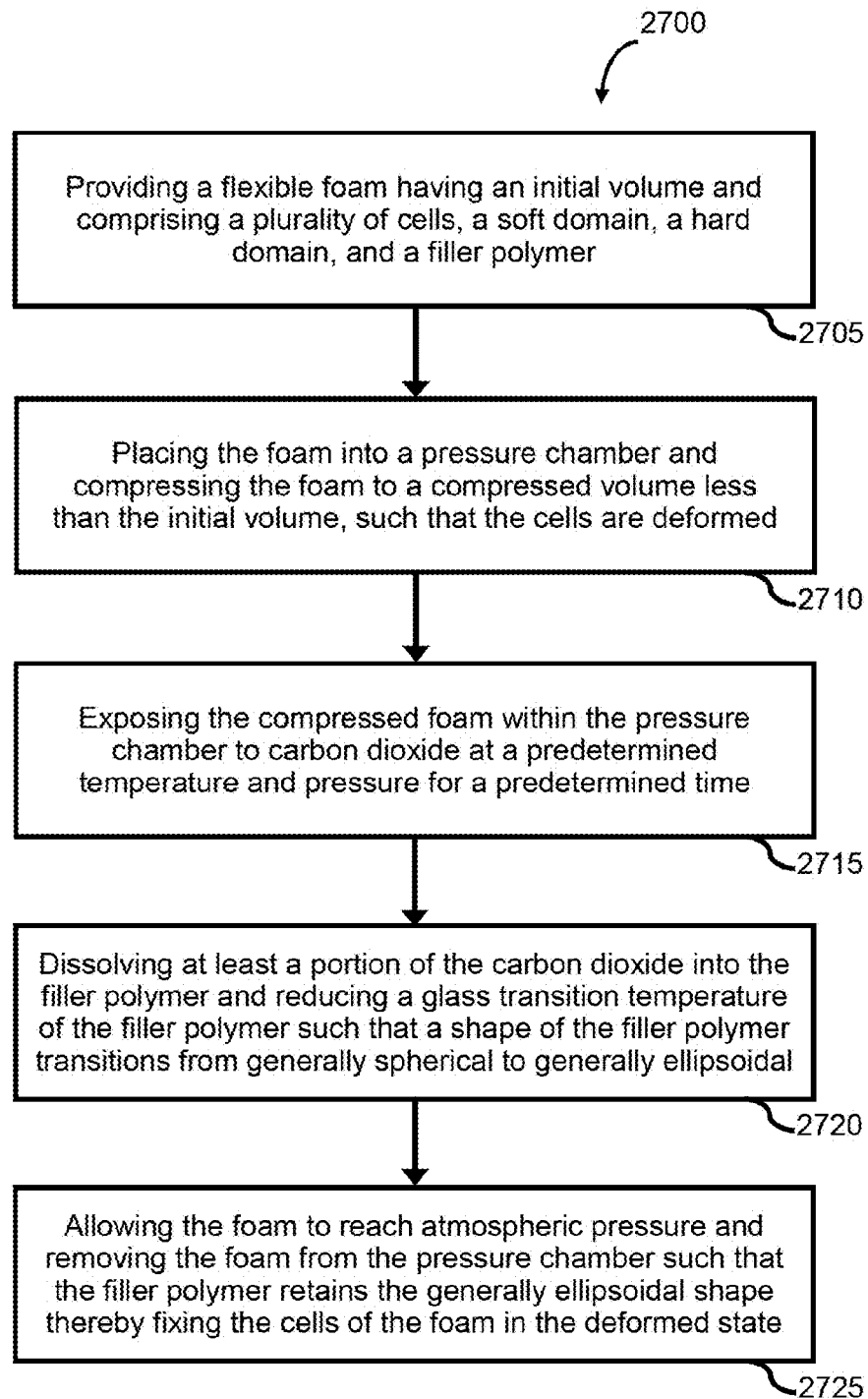
FIG. 27 is a flow chart of an exemplary method for producing an auxetic foam.

FIG. 27 illustrates a general flow diagram of various embodiments of another method 2700 for producing an auxetic foam 205. At step 2705, a flexible foam 205 may be provided. The foam 205 may have an initial volume and may comprise a plurality of cells. A bulk matrix polymer of the foam may comprise a soft domain, and a hard domain. The bulk matrix polymer may comprise a filler polymer. The foam 205 may be placed into a pressure chamber 1915 at step 2710. The foam 205 may be compressed to a compressed volume that is less than the initial volume. The cells of the foam 205 may be deformed when the foam 205 is compressed. At step 2715, the compressed foam 205 may be exposed to carbon dioxide within the pressure chamber 1915. The pressure chamber 1915 may be maintained at a predetermined temperature and pressure for a predetermined time. At least a portion of the carbon dioxide may dissolve into the filler at step 2720. The dissolved carbon dioxide may reduce the glass transition temperature of the filler polymer such that a shape of the filler polymer transitions from generally spherical to generally ellipsoidal. At step 2725, the pressure may be relieved and allowed to reach atmospheric pressure before removing the foam 205 from the chamber 1915, such that the filler polymer retains the generally ellipsoidal shape, thereby fixing the cells of the foam 205 in the deformed state.

Figure 28:
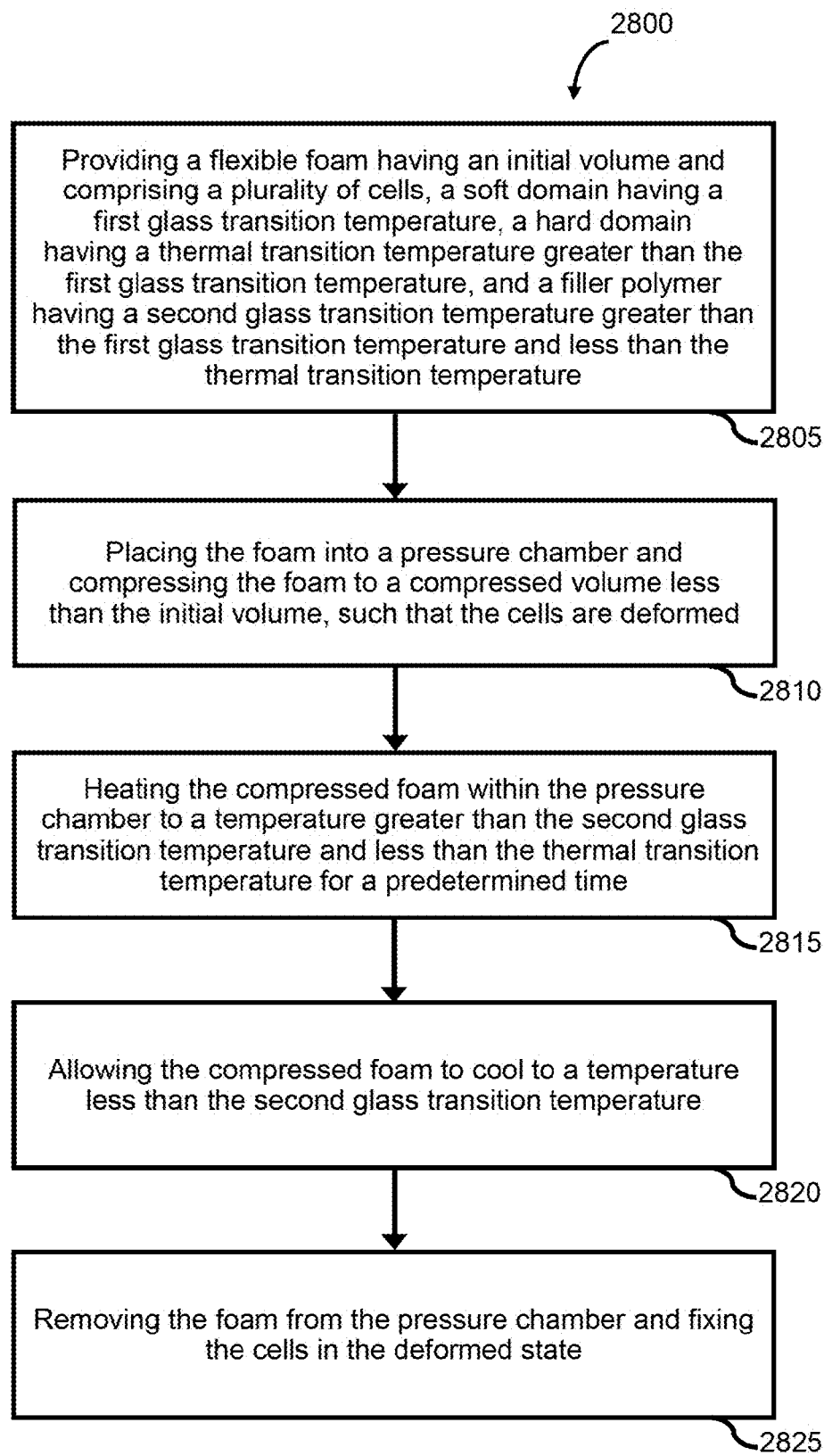
FIG. 28 is a flow chart of an exemplary method for producing an auxetic foam.

FIG. 28 illustrates a general flow diagram of various embodiments of yet another method 2800 for producing an auxetic foam 205. At step 2805, a flexible foam 205 may be provided. The foam 205 may have an initial volume and may comprise a plurality of cells. A bulk matrix polymer of the foam may comprise a soft domain having a first glass transition temperature, and a hard domain having a thermal transition temperature greater than the first glass transition temperature. The bulk matrix polymer may comprise a filler polymer. The filler polymer may have a second glass transition temperature greater than the first glass transition temperature and less than the thermal transition temperature. The second glass transition temperature may be reduced by dissolving a compressed gas in the filler. The foam 205 may be placed into a pressure chamber 1915 at step 2810. The foam 205 may be compressed to a compressed volume that is less than the initial volume. The cells of the foam 205 may be deformed when the foam 205 is compressed. The compressed foam 205 may be exposed to a compressed gas within the pressure chamber 1915. At step 2815, the compressed foam 205 may be heated within the pressure chamber 1915 to a temperature greater than the second glass transition temperature and less than the thermal transition temperature. The compressed foam 205 may be held at the temperature for a predetermined time. The compressed foam 205 may be allowed to cool at step 2820 while remaining in the pressure chamber 1915 to a temperature less than the second glass transition temperature. At step 2825, the foam 205 may be removed from the pressure chamber 1915, thereby fixing the cells of the foam 205 in the deformed state.

EXAMPLES

Example 1

One commercial open-cell, flexible PU foam 205 (SAN content: 31.6 wt %) [58] with nominal cell diameter of 480 µm was employed in this study. The density of the foam was 48.1 kg/m$^3$. The foam 205 was machined into cylindrical specimens with predefined dimensions (see Table 1) using a $CO_2$ laser (VersaLASER, Universal Laser Systems). One of these machined foams 205 was then inserted into a pressure reactor 1915 (CL-1, High Pressure Equipment Company), as shown in FIG. 19. The vessel 1915 was purged with $CO_2$ and then $CO_2$ was fed by a high-pressure ISCO syringe pump 1910 (500 HP, Teledyne Technologies, Inc.) that also was used to maintain the constant system pressure. After equilibrium was established, the pressure was released. Finally, the foams 205 were taken out of the reactor 1915. Poisson's ratio was determined as described previously.

TABLE 1

Radial and axial compression for various volumetric changes.

| Volumetric change | Initial size (cm) | | Imposed size (cm) | |
|---|---|---|---|---|
| | Diameter | Height | Diameter | Height |
| 0.4 | 8.9 | 10 | 7.5 | 8.4 |
| 0.45 | 9.1 | 10 | 7.5 | 8.2 |
| 0.5 | 9.4 | 10 | 7.5 | 7.9 |
| 0.55 | 9.8 | 10 | 7.5 | 7.7 |
| 0.6 | 10.2 | 10 | 7.5 | 7.4 |
| 0.65 | 10.6 | 10 | 7.5 | 7 |
| 0.7 | 11.2 | 10 | 7.5 | 6.7 |
| 0.75 | 11.9 | 10 | 7.5 | 6.3 |
| 0.8 | 12.8 | 10 | 7.5 | 5.8 |
| 0.85 | 14.1 | 10 | 7.5 | 5.3 |

Calculation of Poisson's Ratio Using Missing-rib Model [72] (see insert in FIG. 20B)

Engineering strain may be calculated using Equation 7:

$$\varepsilon_x = 4\left[\frac{\cos(\zeta_0 - \phi_0 + \Delta\phi(\kappa - 1))}{\cos(\zeta_0 - \phi_0)} - 1\right] \quad \text{Eqn. 7}$$

$\kappa = \Delta\zeta/\Delta\phi$ is a measure of relative deformation between the $\zeta$ and $\phi$ springs. Here, $\zeta = 90°$, $\phi = 45°$ and $\kappa = 0.53$.

Poisson's ratio may be calculated using Equation 8:

$$v_{xy} = \frac{\{\cos[\zeta_0 - \phi_0 + \Delta\phi(\kappa - 1)] - \cos(\zeta_0 - \phi_0)\}\sin\phi_0}{(\sin\phi - \sin\phi_0)\cos(\zeta_0 - \phi_0)} \quad \text{Eqn. 8}$$

Calculation of the Glass Transition Temperature of the SAN-$CO_2$ System

The Sanchez-Lacombe equation of state (SL EoS) [73,74] is shown in Equation 9:

$$\tilde{\rho}^2 + \tilde{P} + \tilde{T}\left[\ln(1-\tilde{\rho}) + \left(1 - \frac{1}{r}\right)\tilde{\rho}\right] = 0 \quad \text{Eqn. 9}$$

where $\tilde{T}$, $\tilde{P}$ and $\tilde{\rho}$ are defined as:

$$\tilde{T} = \frac{T}{T^*}; \quad \tilde{P} = \frac{P}{P^*}; \quad \tilde{\rho} = \frac{\rho}{\rho^*}$$

and $T^*$, $P^*$ and $\rho^*$ are the scaling parameters. Table 2 shows the scaling parameters of $CO_2$ and styrene acrylonitrile copolymer (SAN) with an acrylonitrile (AN) content of 30 wt %.

TABLE 2

Scaling parameters of $CO_2$ and styrene acrylonitrile copolymer (SAN) with an acrylonitrile (AN) content of 30 wt %.

| | P* (MPa) | ρ* (kg · m⁻³) | T* (K) | Ref. |
|---|---|---|---|---|
| $CO_2$ | 611.00 | 1413.3 | 278.5 | 4 |
| SAN | 588.68 | 1174.2 | 731.3 | 5 |

The number of lattice sites occupied by a molecule, r, is given by Equation 10:

$$r = \frac{M_W P^*}{RT\rho^*} \quad \text{Eqn. 10}$$

where R is the gas constant and Mw is molecular weight. For mixtures, the mixing rules presented in Equations 11 and 12 are used:

$$P^* = \sum_i \sum_j \phi_i \phi_j P_{ij}^*; \quad T^* = P_* \sum_i \frac{\phi_i^\circ T_i^*}{P_i^*}; \quad \text{Eqn. 11}$$

$$\frac{1}{r} = \sum_i \frac{\phi_i^\circ}{r_i} \quad \text{where}$$

$$P_{ij}^* = (1 - \kappa_{ij})\sqrt{P_i^* P_j^*}; \quad \phi_i = \left(\frac{w_i}{\rho_i^*}\right) \bigg/ \sum_j \frac{w_j}{\rho_j^*}; \quad \text{Eqn. 12}$$

$$\phi_i^\circ = \frac{\phi_i T_i^*}{P_i^*} \bigg/ \sum_j \frac{\phi_j T_j^*}{P_j^*}$$

where $\phi_i$ is the volume fraction of component i and $k_{ij}$ is the binary interaction parameter. The system entropy (S) of a binary system can be derived from SL EoS [75,78] as shown in Equation 13:

$$\frac{S}{rNk} = \left(1 - \frac{1}{\tilde{\rho}}\right)\ln(1-\tilde{\rho}) - \frac{\ln\tilde{\rho}}{r} - \left(\frac{\phi_1}{r_1}\right)\ln\left(\frac{\phi_1}{r_1}\right) - \left(\frac{\phi_2}{r_2}\right)\ln\left(\frac{\phi_2}{r_2}\right) - \quad \text{Eqn. 13}$$

$$\frac{\ln(2/z)}{r} + \frac{1}{r} - 1 + \left(\frac{\phi_1}{r_1}\right)(r_1 - 2)\left[\frac{f_1\Delta\varepsilon_1}{kT} - \ln(1 - f_1)\right] +$$

$$\left(\frac{\phi_2}{r_2}\right)(r_2 - 2)\left[\frac{f_2\Delta\varepsilon_2}{kT} - \ln(1 - f_2)\right]$$

where z is the lattice coordination number and $\Delta\varepsilon_i$ represents the increase of intramolecular energy. $f_i$ is the equilibrium fraction of flexed bonds given by Equation 14:

$$f_i = \frac{(z-2)\exp(-\Delta\varepsilon_i/kT)}{1 + (z-2)\exp(-\Delta\varepsilon_i/kT)} \quad \text{Eqn. 14}$$

Figure 29:
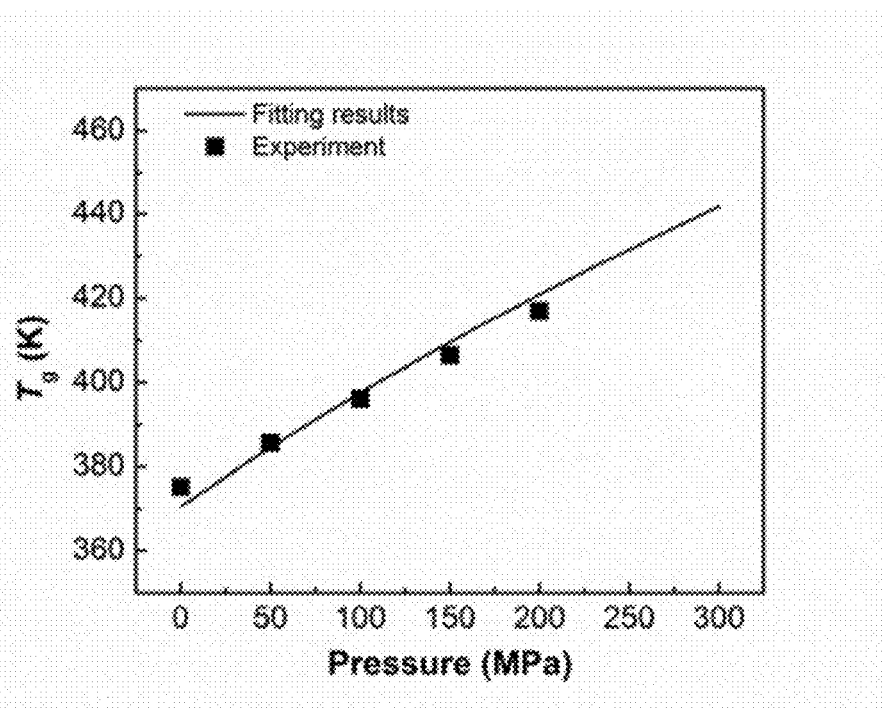
FIG. 29 is a graph of glass transition behavior as a function of pressure for pure SAN.
Figure 30:
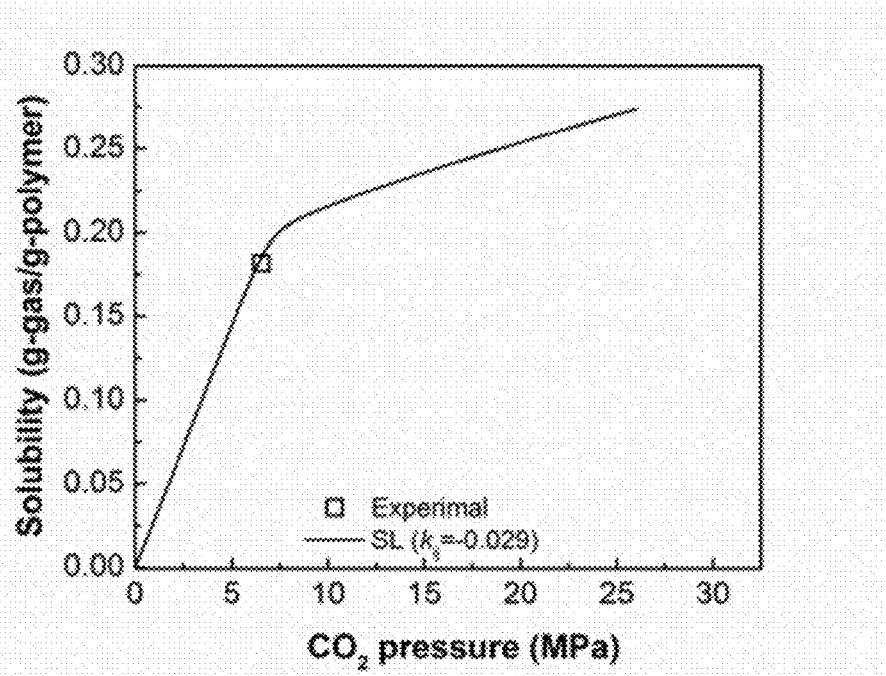
FIG. 30 is a graph showing a comparison of experimental solubility and predicted solubility.

The $\Delta\varepsilon_1$ of $CO_2$ was assumed to be zero. [78] z=4 and $\Delta\varepsilon_2/k$=598.4 K which were obtained by the fitting curve of from glass transition behavior for pure SAN (FIG. 29). [79] The interaction parameter $k_{ij}$=−0.029 was obtained by fitting to experimental solubility of $CO_2$ in SAN at 25° C. and 6.55 MPa (FIG. 30). [70] Thus, $T_g$ of the SAN-$CO_2$ system can be calculated by setting the system entropy equal to zero (Equation 13), according to the Gibbs-Di Marzio criterion (see FIG. 20(a)).

Example 2

Quasi-Static Compression

Compression tests on foams 205 were carried out using a Shimadzu DV-201 fitted with a 1000 N load cell at 23° C. The specimens 205 were cylindrical with diameter and height. The compression rate in all tests was 6 mm/min. The energy absorbed per unit volume at a certain peak stress, was obtained by calculating the area under the stress-strain curve up the peak stress.

Cyclic Loading Experiments

In this test, each specimen 205 was cyclically compressed in the load frame to a set strain endpoint for 100 cycles. The compression rate in all tests was 6 mm/min.

Dynamic Mechanical Analyzer (DMA) Test

Dynamic properties of foams 205 were examined using a dynamic mechanical analyzer (DMA, TA Instruments DMA Q800) equipped with a parallel-plate compression clamp with a diameter of 15 mm. Test were performed in compression mode at 23° C. at a wide frequency range from 0.01 to 100 HZ with a dynamic strain of 2% with an appropriate static preload of 0.05 N.

Results

Figure 31:
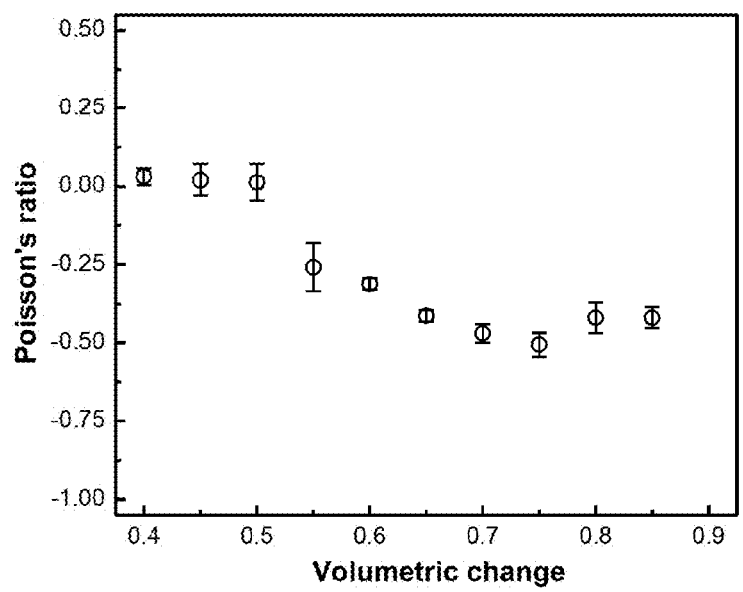
FIG. 31 is a graph showing the effect of volumetric change on Poisson's ratio of auxetic PU foams during auxetic manufacture with compressed $CO_2$.
Figure 32:
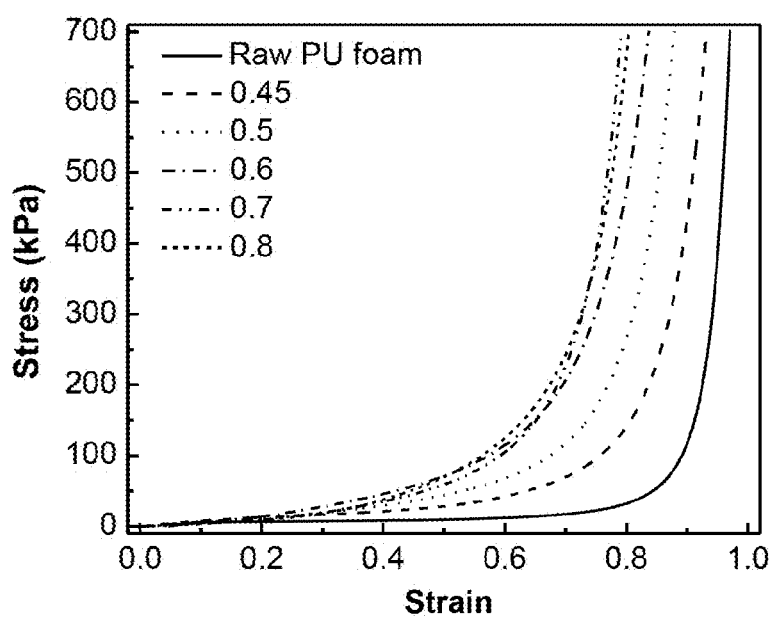
FIG. 32 is a graph showing stress-strain plots from the compression test of foams with different volumetric change ratios.
Figure 33:
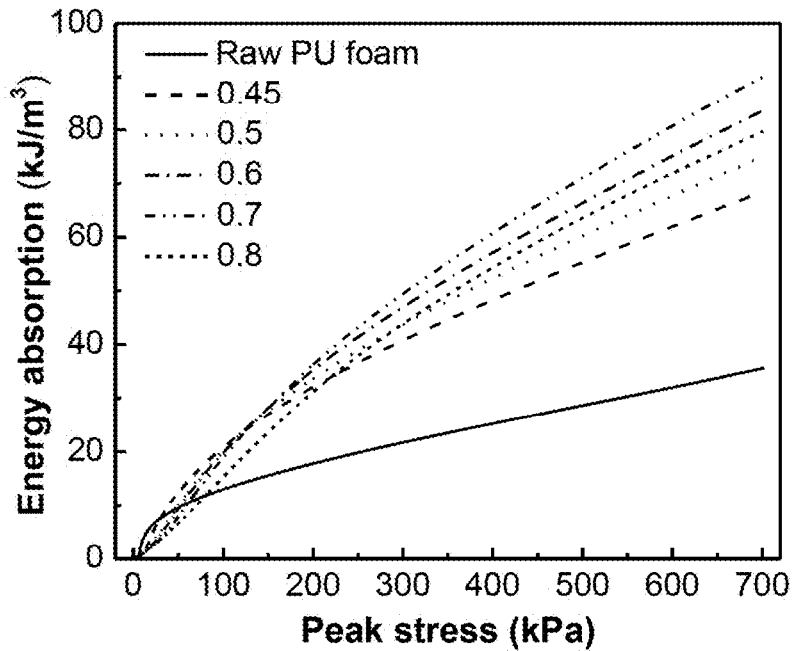
FIG. 33 is a graph showing energy absorption (W) versus peak stress curve of foams with different volumetric change ratios.

The test results for Example 2 are present in FIGS. 31 through 36. FIG. 31 shows the effect of volumetric change on the Poisson's ratio of auxetic PU foams 205 during auxetic manufacture with compressed $CO_2$. FIG. 32 shows the stress-strain plots from the compressions tests of foams 205 with different volumetric change ratios. FIG. 33 shows the energy adsorption (W) versus peak stress curve of foams 205 with different volumetric change ratios, where W is calculated using Equation 15:

$$W = \int_0^E \sigma(e)de \quad \text{Eqn. 15}$$

Figure 34:
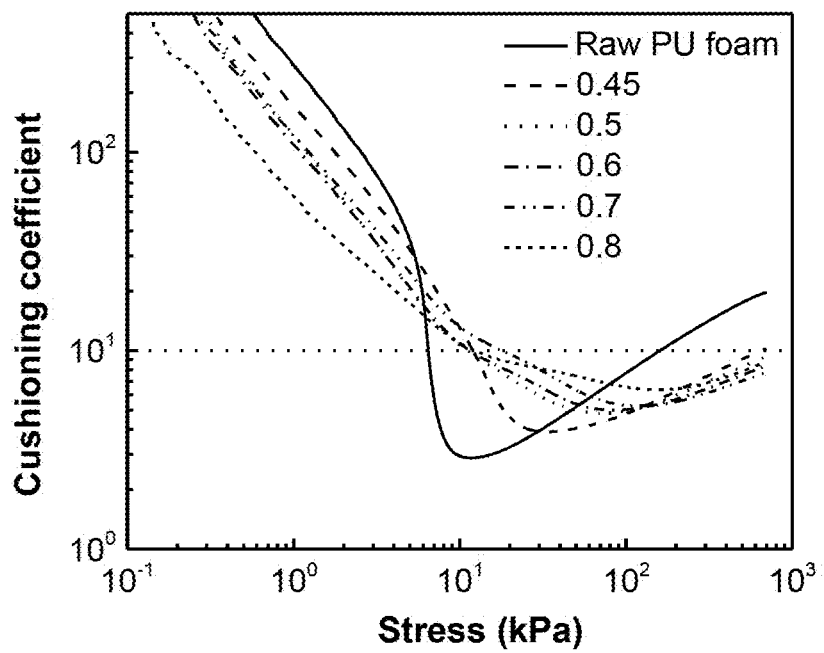
FIG. 34 is a graph showing cushioning coefficient (C) versus stress curve of foams with different volumetric change ratios.

FIG. 34 shows the cushioning coefficient (C) versus stress curve of foams 205 with different volumetric change ratios, where C is calculated using Equation 16:

$$C = \frac{\sigma}{\int_0^\varepsilon \sigma(e)de} \qquad \text{Eqn. 16}$$

Figure 35:
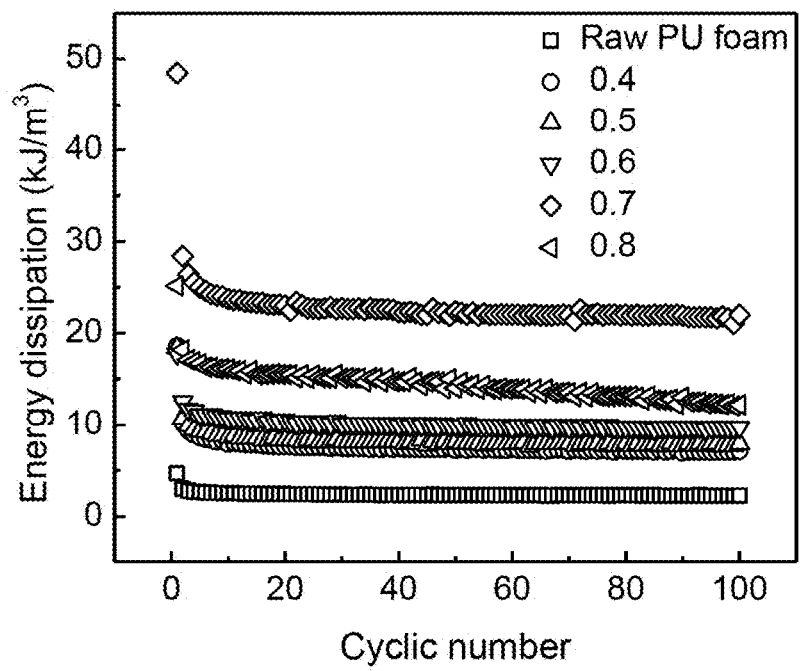
FIG. 35 is a graph showing energy dissipation of foams with different volumetric change ratios (and Poisson's ratios).
Figure 36:
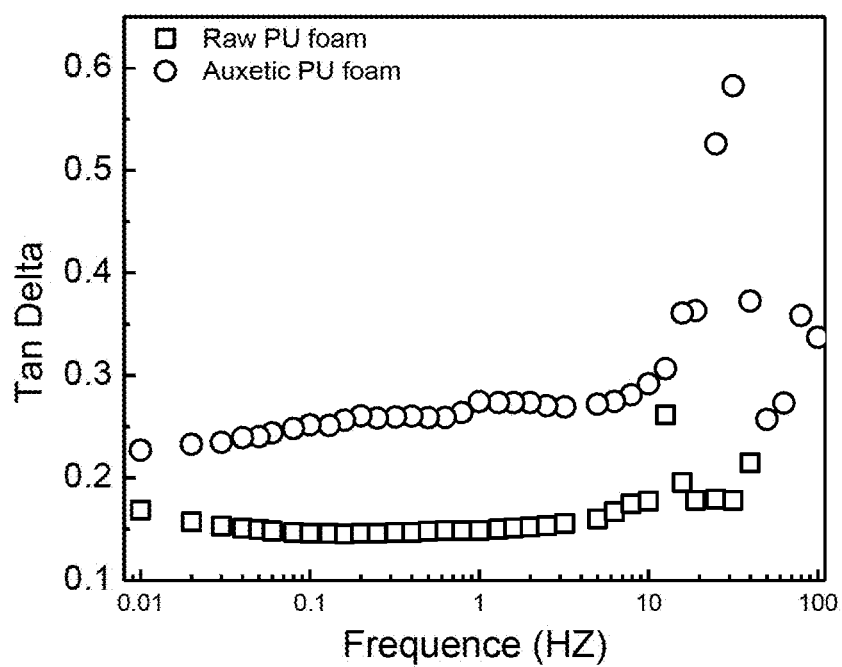
FIG. 36 is a graph showing dynamic properties of raw PU foam and auxetic PU foam.

FIG. 35 shows the energy dissipation of foams 205 with different volumetric change ratios (and Poisson's ratios). FIG. 36 shows dynamic properties of raw PU foam 205 and auxetic PU foam 205. Higher tan delta indicates higher energy dissipation capability.

Definition of Claim Terms

Auxetic: Materials having a Poisson's ratio less than zero. Auxetic materials expand laterally during stretching and shrink under compression.

Cell: In a flexible foam material, void spaces within the otherwise solid foam material.

Deformed: For a foam cell, the point at which the cell walls (or struts) buckle inward into the cell when pressure is applied to the foam.

Foam: A substance formed by trapping pockets of gas within a liquid or solid. The pockets of gas form cells within the foam.

Glass transition temperature: The temperature below which a polymer becomes more hard and brittle and above which the polymer is more soft and flexible.

Glassy state: A hard, brittle state of a polymer material that is below its glass transition temperature.

Hard domain: A polymer material below its glass transition temperature.

Poisson's ratio: a physical property of a material calculated as the fraction of expansion divided by the fraction of compression for a material that is compressed in one direction while expanding in two other directions.

Rubbery state: a soft, flexible state of a polymer material that is above its glass transition temperature.

Soft domain: A polymer material above its glass transition temperature.

Thermal transition temperature: A temperature at which a physical property of a material changes, including but not limited to a glass transition temperature, a melting temperature, or a solidification temperature.

REFERENCES

[1] Lakes, R. *Science* 1987, 27, 1038-1040.
[2] Evans, K. E.; Nkansah, M. A.; Hutchinson, I. J.; Rogers, S. C. *Nature* 1991, 353, 124.
[3] Lakes, R. *Nature* 1992, 358, 713-714.
[4] Evans, K. E. *Chemistry and Industry* 1990, 20, 654-657.
[5] Love, A. E. H. A treatise on the mathematical theory of elasticity, Dover: New York, 1927; p 104.
[6] Lakes, R. S.; Elms, K.; *Journal of Composite Materials* 1993, 27, 1193.
[7] Alderson, A. *Chemistry and Industry* 1999, 10, 384-391.
[8] Evans, K. E.; Alderson, A. *Advanced Materials* 2000, 12, 617-628.
[9] Evans, K. E. *Composite Structures* 1991, 17, 95.
[10] Bianchi, M.; Scarpa. F. L.; Smith. C. W. *Journal of Materials Science* 2008, 43, 5851-5860.
[11] Doyoyo, M.; Hu, J. W. Journal of the Mechanics and Physics of Solids 2006, 54, 1479-1492.
[12] Lira, C.; Scarpa, F.; Olszewska, M.; Celuch, M. *Physica Status Solidi B* 2009, 246, 2055-2062.
[13] Lira, C.; Scarpa, F. *Composites Science and Technology* 2010, 70, 930-936.
[14] Scarpa. F.; Tomlinson, G. *Journal of Sound and Vibration* 2000, 230, 45.
[15] Scarpa, F.; Giacomin, J.; Zhang, Y.; Pastorino, P. *Cellular Polymers* 2005, 24, 253-268.
[16] Smith, F. C.; Scarpa, F. *IEEE Microwave and Guided Wave Letters* 2000, 10, 451-453.
[17] Hassan, M. R.; Scarpa, F.; Ruzzene, M.; Mohammed, N. A. *Materials Science and Engineering A* 2008, 481-482, 654-657.
[18] Chan, N.; Evans, K. E. *Journal of Cellular plastics* 1999, 35, 130-165.
[19] Scarp, F.; Pastorino, P.; Garelli, A.; Patsias, S.; Ruzzene, M. *Physica Status Solidi B* 2005, 242, 681-694.
[20] Alderson, K.; Alderson, A.; Ravirala, N.; Simkins, V.; Davies, *Physica Status Solidi B* 2012, 249, 1315-1321.
[21] Bianchi, M.; Scarpa, F. L.; Smith, C. W. *Journal of Materials Science* 2008, 43, 5851-5860.
[22] Bianchi, M.; Scarpa, F.; Banse, M.; Smith, C. W. *Acta Materialia* 2011, 59, 686-691.
[23] Phan-Tien, N.; Karihaloo, B. L. *Journal of Applied Mechanics* 61, 1001-1004.
[24] Chan, N.; Evans, K. E. *Journal of Materials Science* 1997, 32, 5945-5953.
[25] Wang, Y. C.; Lakes, R.; Butenhoff, A. *Cellular Polymer* 2001, 20, 373-385.
[26] Friis, E. A.; Lakes. R.; Park, J. B. *Journal of Materials Science* 1988, 23, 4406-4414.
[27] Choi, J. B.; Lakes, R. *Journal of Materials Science* 1992, 27, 4678-4684.
[28] Bianchi. M.; Scarpa, F.; Smith, C. W.; Whittell. G. R. *Journal of Materials Science* 2010, 45, 341-347.
[29] Bianchi, M.; Frontoni, S.; Scarpa, F.; Smith, C. W. *Physica Status Solidi B* 2011, 248, 30-38.
[30] McDonald, S. A.; Ravirala, N.; Withers, P. J.; Alderson, A. *Scripta Materialia* 2009, 60, 232-235.
[31] Loureiro, M. A.; Lakes, R. S. *Cellular Polymer* 1997, 16, 349-363.
[32] Critchley, R.; Corni, I.; Wharton, J. A.; Walsh, F. C.; Wood, R. J. K.; Stokes, K. *Physica Status Solidi B* 2013, 250, 1963-1982.
[34] Greaves, G. N.; Greer, A. L.; Lakes, R. S.; Rouxel, T. *Nature Materials* 2011, 10, 823-837.
[35] Lee, S. T.; Ramesh, N. S. Polymeric Foams: Mechanisms and Materials 2004, CRC Press, New York. p 139-251.
[36] Li, W.; Ryan, A. J. *Macromolecules* 2002, 35, 5034-5042.
[37] Teo, L.; Chen. C. Kuo. J. *Macromolecules* 1997, 30, 1793-1799.
[38] Lee, H. S.; Wang, Y. K.; Hsu, S. L. *Macromolecules* 1987, 20, 2089-2095.
[39] Sonnenschein, M. F.; Prange, R.; Schrock, A. K. *Polymer* 2007, 48, 616-623.
[40] Kaushiva, B. D.; Wilkes, G. L. *Journal of Applied Polymer Science* 2000, 77, 202-216.
[41] Kaushiva, B. D.; Dounis, D. V.; Wilkes, G. L. *Journal of Applied Polymer Science* 2000, 78, 766-786.
[42] Andersson, A.; Lundmark, S.; Magnusson, A.; Maurer, F. H. J. *Journal of Applied Polymer Science* 2009, 111, 2290-2298.
[43] Gibson, L. J.; Ashby, M. F. *Cellular Solids: Structure and Properties,* 2nd ed.; Cambridge University press: New York, 1997; p 184.
[44] Sperling, L. H. *Polymeric Multicomponent Matereials: An Introduction,* Wiley-Interscience: New York, 1998; p 20-23.
[45] Guth, E. Journal of Applied Physics, 1945, 16, 20-25.

[46] Kaushiva, B. D.; Wilkes, G. L. *Polymer* 2000, 41, 6981-6986.
[47] Choi, T.; Fragiadakis, D.; Roland, C. M.; Tunt, J. *Macromolecules* 2012, 45, 3581-3589.
[48] Koerner, H.; Luo, Y.; Li, X.; Cohen, C.; Hedden, R.; Ober, C. *Macromolecules* 2003, 36, 1975-1981.
[49] Miller, J. B.; McGrath, K. J.; Roland, C. M.; Trask, C. A.; Garroway, A. N. *Macromolecules* 1990, 23, 4543-4547.
[50] Kaushiva, B. D.; McCartney, S. R.; Rossmy, G. R.; Wilkes, G. L. *Polymer* 2000, 41, 285-310.
[53] Williams, G.; Watts, D. C. *Transactions of the Faraday Society* 1970, 66, 88-85.
[54] Ngai, K. L. *Relaxation and Diffusion in Complex Systems*, Springer: New York, 2011; p 1-2.
[55] J. N. Grima. D. Attard, R. Gatt and R. N. Cassar, Adv. Eng. Mater., 2009, 11, 533.
[56] J. Lisiecki, T. Blazejewicz, S. Klysz, G. Gmurczyk, P. Reymer, G. Mikulowski, *Phys. Status Solidi B* 2013, 10, 1988.
[57] R. Coquard, D. Baillis, in Cellular and Porous Materials: Thermal Properties Simulation and Prediction, ed. A. Öchsner, G. E. Murch, M. de Lemos, Wiley, Weinheim, 2008, ch. 11, pp 343-84.
[58] Y. Li, M. D. Jahan, H. Wang, M. Burkett, Y. Li, C. Zeng, submitted to.
[59] F. Rindfleisch, T P. DiNoia and M. A. McHugh, *J. Phys. Chem.*, 1996, 100, 15581.
[60] S. L. Wells and J. DeSimone, *Angew. Chem. Int. Ed.*, 2001, 40, 518.
[61] D. L. Tomasko, H. Li, D. Liu, X. Han, M. J. Wingert, L. J. Lee, K. W. Koelling, *Ind. Eng. Chem. Res.*, 2003, 42, 6431.
[62] M. Poliakoff, J. M. Fitzpatrick, T. R. Farren, P. T. Anastas, *Science*, 2002, 297, 807.
[63] R. A. Sheldon, *Green Chem.*, 2005, 7, 267.
[64] S. P. Nalawade, F. Picchioni, L. P. B. M. Janssen, *Prog. Polym. Sci.*, 2006, 31, 19.
[65] Y. Li, Z. Chen and C. Zeng, in *Polymer Nanocomposite Foams*, ed. V. Mittal, CRC Press, New York, 2014, ch. 1, pp. 6.
[66] Y. Li, C. Zeng, *Macromol. Chem. Phys.*, 2013, 214, 2733.
[67] I. KiKic, F. Vecchione, P. Alessi, A. Cortesi, F. Eva, *Ind. Eng. Chem. Res.*, 2003, 42, 3022.
[68] Q. Lan, J. Yu, J. He, F. J. Maurer, J. Zhang, *Macromolecules*, 2010, 43, 8602.
[69] A. V. Nawaby, Y. p. Handa, X. Liao, Y. Yoshitaka, M. Tomohiro, *Polym. Int.*, 2007, 56, 67.
[70] A. R. Berens, G. S. Huvard, in *Supercritical fluid Science and Technology*, ed. K. P. Johnston, J. M. L. Penninger, American Chemical Society, Washington, D.C., 1989, Ch. 14, pp. 207-223.
[71] C. W. Smith, J. N. Grima, K. E. Evans, *Acta Mater.*, 2000, 48, 4349.
[72] N. Gaspar, X. J. Ren, C. W. Swith, J. N. Grima, K. E. Evans, *Acta Mater.*, 2005, 53, 2439.
[73] I. Sanchez, R. Lacombe, *J. Phys. Chem.* 1976, 80, 2352.
[74] I. Sanchez, R. Lacombe, *Macromolecules* 1978, 11, 1145.
[75] P. Condo, I. Sanchez, C. Panayiotou, K. Johnston, *Macromolecules* 1992, 25, 6119.
[76] Z. Chen, K. Cao, Z. Yao and Z. Huang, *J. Supercrit. Fluids*, 2009, 49, 143.
[77] G. Wen, Z. Sun, T. Shi, W. Jiang, L. An and B. Li, *Macromolecules*, 2001, 34, 6291.
[78] D. Liu, H. Liu, M. Noon and D. Tomasko, *Macromolecules*, 2005, 38, 4416.
[79] M. Schmidt and M. Olsson, *J. Chem. Phys.*, 2000, 112, 11095.
[80] Williams, G. and D. C. Watts, Non-symmetrical dielectric relaxation behaviour arising from a simple empirical decay function. Transactions Faraday Society, 1970. 66: p. 80-85.
[81] Ngai, K. L., *Relaxation and diffusion in complex systems*. 2011, New York: Springer.
[82] Tomasko, D. L., Li, H., Liu, D., Han, X., Wingert M. J., Lee, L. J., K. W., Koelling, *A Review of $CO_2$ Applications in the Processing of Polymers*. Industrial & Engineering Chemistry Research, 2003. 42(25): p. 6431-6456.

What is claimed is:

1. A method for producing an auxetic foam, comprising:
providing a flexible foam having an initial volume, the foam comprising a plurality of cells, and further comprising a soft domain, a hard domain, and a filler polymer;
placing the foam into a pressure chamber and compressing the foam to a compressed volume less than the initial volume, such that the cells are deformed;
exposing the compressed foam within the pressure chamber to a compressed gas, and maintaining the pressure chamber at a predetermined temperature and predetermined pressure for a predetermined time;
dissolving at least a portion of the compressed gas into the filler polymer and reducing a glass transition temperature of the filler polymer such that the filler polymer transitions from a glassy state to a rubbery state, wherein a shape of the filler polymer changes from generally spherical to generally ellipsoidal when the compressed gas dissolves into the filler polymer; and
allowing the foam to reach atmospheric pressure and removing the foam from the pressure chamber such that the filler polymer transitions from the rubbery state to the glassy state and fixes the cells of the foam in the deformed state.

2. The method of claim 1, wherein the filler polymer comprises styrene acrylonitrile copolymer.

3. The method of claim 1, wherein the compressed volume of the foam ranges from about 15 percent to about 85 percent of the initial volume.

4. The method of claim 1, wherein the predetermined temperature and predetermined pressure are selected to produce a glass transition temperature of the filler polymer ranging from about 150K to about 710K.

5. The method of claim 1, wherein the predetermined pressure ranges from about 0 MPa to about 100 MPa.

6. The method of claim 1, wherein the predetermined time ranges from about 1 minute to about 4 hours.

7. The method of claim 1, wherein the predetermined temperature is less than about 710K.

8. The method of claim 1, wherein the predetermined temperature is about 298K, the predetermined pressure is about 5 MPa, and the predetermined time is less than about 10 minutes.

9. The method of claim 1, wherein the compressed gas is primarily carbon dioxide or nitrogen.

10. The method of claim 1, wherein the compressed gas is carbon dioxide.

11. The method of claim 1, wherein the foam has a Poisson's ratio greater than zero prior to placement in the pressure chamber and a Poisson's ratio less than zero after removal from the pressure chamber.

12. The method of claim 1, wherein varying a concentration of the filler polymer in the foam causes variation of mechanical properties of the foam.

13. The method of claim 1, wherein the pressure chamber further comprises a mold, and the flexible foam conforms to a shape of the mold after removal of the foam from the pressure chamber.

14. A method for producing an auxetic foam, comprising:
providing a flexible foam having an initial volume, the foam comprising a plurality of cells and further comprising a soft domain, a hard domain, and a filler polymer;
placing the foam into a pressure chamber and compressing the foam to a compressed volume less than the initial volume, such that the cells are deformed;
exposing the compressed foam within the pressure chamber to carbon dioxide at a predetermined temperature and predetermined pressure for a predetermined time;
dissolving at least a portion of the carbon dioxide into the filler polymer and reducing a glass transition temperature of the filler polymer such that a shape of the filler polymer transitions from generally spherical to generally ellipsoidal; and
allowing the foam to reach atmospheric pressure and removing the foam from the pressure chamber such that the filler polymer retains the generally ellipsoidal shape thereby fixing the cells of the foam in the deformed state.

15. The method of claim 14, wherein the filler polymer comprises styrene acrylonitrile copolymer.

16. The method of claim 14, wherein the compressed volume of the foam ranges from about 15 percent to about 85 percent of the initial volume.

17. The method of claim 14, wherein the predetermined temperature ranges from about 150K to about 710K and the predetermined pressure ranges from about 0 MPa to about 100 MPa.

* * * * *